US010083046B2

(12) United States Patent
Daudel et al.

(10) Patent No.: US 10,083,046 B2
(45) Date of Patent: Sep. 25, 2018

(54) ENSURING DETERMINISM DURING PROGRAMMATIC REPLAY IN A VIRTUAL MACHINE

(71) Applicant: CA, Inc., New York, NY (US)

(72) Inventors: Jeffrey Daudel, South San Francisco, CA (US); Suman Cherukuri, Cupertino, CA (US); Humberto Yeverino, Menlo Park, CA (US); Dickey Singh, San Carlos, CA (US); Arpad Jakab, Oakland, CA (US); Marvin Justice, San Mateo, CA (US); Jonathan Lindo, Emerald Hills, CA (US)

(73) Assignee: CA, Inc., New York, NY (US)

( * ) Notice: Subject to any disclaimer, the term of this patent is extended or adjusted under 35 U.S.C. 154(b) by 5 days.

(21) Appl. No.: 15/401,387

(22) Filed: Jan. 9, 2017

(65) Prior Publication Data

US 2017/0116110 A1    Apr. 27, 2017

Related U.S. Application Data

(63) Continuation of application No. 14/293,923, filed on Jun. 2, 2014, now Pat. No. 9,542,210, which is a (Continued)

(51) Int. Cl.
*G06F 9/44* (2018.01)
*G06F 9/445* (2018.01)
(Continued)

(52) U.S. Cl.
CPC .......... *G06F 9/445* (2013.01); *G06F 9/44521* (2013.01); *G06F 9/44589* (2013.01);
(Continued)

(58) Field of Classification Search
CPC .... G06F 9/5055; G06F 9/524; G06F 9/44563; G06F 9/44589; G06F 8/447; G06F 8/656; H04M 3/242
See application file for complete search history.

(56) References Cited

U.S. PATENT DOCUMENTS 5,740,441 A * 4/1998 Yellin ................. G06F 9/44589
714/E11.211
5,828,880 A   10/1998 Hanko
(Continued)

OTHER PUBLICATIONS

Marcel C. Baur, "Instrumenting Java Bytecode to Replay Execution Traces of Multithreaded Programs", ETH Zurich, Apr. 2003, 156 pg. <Baur_replayApi.pdf>.*
(Continued)

*Primary Examiner* — Tuan A Vu
(74) *Attorney, Agent, or Firm* — Vierra Magen Marcus LLP

(57) ABSTRACT

Aspects of an application program's execution which might be subject to non-determinism are performed in a deterministic manner while the application program's execution is being recorded in a virtual machine environment so that the application program's behavior, when played back in that virtual machine environment, will duplicate the behavior that the application program exhibited when originally executed and recorded. Techniques disclosed herein take advantage of the recognition that only minimal data needs to be recorded in relation to the execution of deterministic operations, which actually can be repeated "verbatim" during replay, and that more highly detailed data should be recorded only in relation to non-deterministic operations, so that those non-deterministic operations can be deterministically simulated (rather than attempting to re-execute those (Continued)

operations under circumstances where the outcome of the re-execution might differ) based on the detailed data during replay.

20 Claims, 10 Drawing Sheets

Related U.S. Application Data continuation of application No. 12/826,435, filed on Jun. 29, 2010, now Pat. No. 8,769,518.

(51) Int. Cl.
 *G06F 9/455* (2018.01)
 *G06F 11/36* (2006.01)
 *G06F 9/54* (2006.01)

(52) U.S. Cl.
 CPC .......... *G06F 9/455* (2013.01); *G06F 9/45504* (2013.01); *G06F 11/3636* (2013.01); *G06F 9/542* (2013.01)

(56) References Cited

U.S. PATENT DOCUMENTS

| | | | |
|---|---|---|---|
| 5,966,702 A | 10/1999 | Fresko et al. | |
| 6,003,038 A | 12/1999 | Chen | |
| 6,009,269 A | 12/1999 | Burrows et al. | |
| 6,061,520 A * | 5/2000 | Yellin | G06F 8/447 703/22 |
| 6,081,665 A | 6/2000 | Nilsen et al. | |
| 6,101,524 A | 8/2000 | Choi et al. | |
| 6,499,048 B1 | 12/2002 | Williams | |
| 6,662,362 B1 | 12/2003 | Arora et al. | |
| 6,766,521 B1 | 7/2004 | Bracha et al. | |
| 6,795,966 B1 | 9/2004 | Lim et al. | |
| 6,832,967 B2 | 12/2004 | Choi et al. | |
| 6,854,108 B1 | 2/2005 | Choi | |
| 6,883,166 B1 | 4/2005 | Thompson | |
| 6,886,081 B2 | 4/2005 | Harres | |
| 7,069,554 B1 | 6/2006 | Stammers et al. | |
| 7,426,720 B1 | 9/2008 | Fresko | |
| 7,506,318 B1 | 3/2009 | Lindo et al. | |
| 7,526,760 B1 | 4/2009 | Daynes et al. | |
| 7,536,679 B1 | 5/2009 | O'Connell et al. | |
| 7,676,181 B2 | 3/2010 | Lindo et al. | |
| 7,721,139 B2 | 5/2010 | Castro et al. | |
| 7,844,665 B2 * | 11/2010 | Holt | G06F 9/44563 709/204 |
| 8,079,019 B2 | 12/2011 | Lindo et al. | |
| 8,402,318 B2 | 3/2013 | Nieh et al. | |
| 8,499,299 B1 | 7/2013 | Jakab et al. | |
| 8,732,670 B1 | 5/2014 | Daudel et al. | |
| 2003/0033344 A1 | 2/2003 | Abbott et al. | |
| 2003/0135844 A1 | 7/2003 | Yellin et al. | |
| 2003/0149966 A1 | 8/2003 | McGuire | |
| 2003/0187311 A1 | 10/2003 | Abd-El-Malek et al. | |
| 2004/0019887 A1 | 1/2004 | Taylor et al. | |
| 2004/0098447 A1 * | 5/2004 | Verbeke | G06F 9/5055 709/201 |
| 2004/0153996 A1 | 8/2004 | Boykin et al. | |
| 2004/0267804 A1 | 12/2004 | Fresko et al. | |
| 2005/0177821 A1 | 8/2005 | Ogata et al. | |
| 2005/0216885 A1 | 9/2005 | Ireland | |
| 2006/0225065 A1 | 10/2006 | Chandhok et al. | |
| 2006/0271922 A1 | 11/2006 | Chan et al. | |
| 2007/0006198 A1 * | 1/2007 | Kakivaya | G06F 9/524 717/151 |
| 2007/0039000 A1 | 2/2007 | Lakshmikantha et al. | |
| 2007/0065799 A1 * | 3/2007 | Potts | H04M 3/242 434/362 |
| 2007/0276879 A1 | 11/2007 | Rothman et al. | |
| 2008/0046699 A1 | 2/2008 | Pauw et al. | |
| 2008/0115117 A1 | 5/2008 | Wilkinson et al. | |
| 2008/0141255 A1 | 6/2008 | Browning et al. | |
| 2008/0209422 A1 | 8/2008 | Coha | |
| 2008/0276227 A1 | 11/2008 | Greifeneder | |
| 2008/0313652 A1 | 12/2008 | Klein et al. | |
| 2009/0119665 A1 | 5/2009 | Venkitachalam et al. | |
| 2009/0133033 A1 | 5/2009 | Lindo et al. | |
| 2009/0150863 A1 | 6/2009 | Guo et al. | |
| 2009/0235002 A1 | 9/2009 | Nir-Buchbinder et al. | |
| 2009/0235262 A1 | 9/2009 | Ceze et al. | |
| 2010/0042789 A1 | 2/2010 | Gonion et al. | |
| 2010/0057965 A1 | 3/2010 | Nir-Buchbinder et al. | |
| 2010/0153776 A1 | 6/2010 | Vick et al. | |
| 2010/0205593 A1 | 8/2010 | Bosschaert et al. | |
| 2010/0287352 A1 | 11/2010 | Chapman et al. | |
| 2010/0318991 A1 | 12/2010 | Venkitachalam et al. | |
| 2011/0078666 A1 | 3/2011 | Altekar | |
| 2011/0264959 A1 | 10/2011 | Subhraveti | |
| 2011/0283256 A1 * | 11/2011 | Raundahl Gregersen | G06F 8/656 717/108 |
| 2012/0204060 A1 | 8/2012 | Swift et al. | |
| 2014/0229947 A1 | 8/2014 | Daudel et al. | |

OTHER PUBLICATIONS

Czajkowski, et al., "Multitasking Without Compromise: a Virtual Machine Evolution," Proceedings of the 16th ACM SIGPLAN conference on Object-oriented programming, systems, languages, and application, Nov. 1, 2001; pp. 125-138, 14 pages.

Liang, Sheng, "The Java™ Native Interface: Programmer's Guide and Specification" Sun Microsystems, Inc., 1991, 318 pages.

Baur, Marcel, "Instrumenting Jaza Bytecode to Replay Execution Traces of Multithreaded Programs", ETH Zurich, Apr. 2003, 156 pg. ,<InstReplay.pdf.>.

Office Action dated Jan. 18, 2013 for U.S. Appl. No. 12/826,435.

Response to Office Action dated Jan. 18, 2013 for U.S. Appl. No. 12/826,435, filed Apr. 18, 2013.

Final Office Action dated Jun. 27, 2013 for U.S. Appl. No. 12/826,435.

Appeal Brief and Amendment filed in response to Final Office Action for U.S. Appl. No. 12/826,435 dated Jun. 27, 2013, filed Nov. 26, 2013.

Notice of Allowance for U.S. Appl. No. 12/826,435 dated Feb. 26, 2014.

U.S. Appl. No. 12/825,923, filed Jun. 29, 2010.

Office Action dated Sep. 14, 2012 for U.S. Appl. No. 12/825,923.

Response to Office Action dated Sep. 14, 2012 for U.S. Appl. No. 12/825,923, filed Dec. 14, 2012.

Office Action dated Oct. 12, 2012 for U.S. Appl. No. 12/825,932.

Response to Office Action dated Oct. 12, 2012 for U.S. Appl. No. 12/825,932, filed Jan. 8, 2013.

Restriction Requirement dated May 21, 2013 for U.S. Appl. No. 12/826,447.

Final Rejection dated Mar. 29, 2013 for U.S Appl. No. 12/825,923.

Notice of Allowance dated Apr. 2, 2013 for U.S. Appl. No. 12/825,932.

Non-final Office Action dated Aug. 13, 2015, U.S. Appl. No. 14/293,923, filed Jun. 2, 2014.

Choi et al., "Deterministic Replay of Java Multithreaded Applications," SPDT 1998, pp. 48-59.

Marcel C. Baur, "Instrumenting Java Bytecode to Replay Execution Traces of Multithreaded Programs," ETH Zurich, Apr. 2003, 156 pg.

Response to Office Action dated Nov. 12, 2015, U.S. Appl. No. 14/293,923, filed Jun. 2, 2014.

Final Office Action dated Jan. 8, 2016, U.S. Appl. No. 14/293,923, filed Jun. 2, 2014.

Response to Office Action dated Feb. 29, 2016, U.S. Appl. No. 14/293,923, filed Jun. 2, 2014.

Non-final Office Action dated May 20, 2016, U.S. Appl. No. 14/293,923, filed Jun. 2, 2014.

Response to Office Action dated Aug. 16, 2016, U.S. Appl. No. 14/293,923, filed Jun. 2, 2014.

Notice of Allowance dated Aug. 31, 2016, U.S. Appl. No. 14/293,923, filed Jun. 2, 2014.

* cited by examiner

ENSURING DETERMINISM DURING PROGRAMMATIC REPLAY IN A VIRTUAL MACHINE

CLAIM OF PRIORITY

This application is a continuation of U.S. patent application Ser. No. 14/293,923, entitled "ENSURING DETERMINISM DURING PROGRAMMATIC REPLAY IN A VIRTUAL MACHINE," filed Jun. 2, 2014 and issued as U.S. Pat. No. 9,542,210 on Jan. 10, 2017, which is a continuation of U.S. patent application Ser. No. 12/826,435, entitled "ENSURING DETERMINISM DURING PROGRAMMATIC REPLAY IN A VIRTUAL MACHINE," filed Jun. 29, 2010 and issued as U.S. Pat. No. 8,769,518 on Jul. 1, 2014, both of which are incorporated herein by reference in their entirety.

CROSS REFERENCE TO RELATED APPLICATIONS

The present application is related to the following three commonly owned United States patent applications: U.S. application Ser. No. 12/825,923, titled "Advancing and Rewinding a Replayed Virtual Machine Application Program Execution", filed Jun. 29, 2010; U.S. application Ser. No. 12/826,447, titled "Ensuring Determinism During Programmatic Replay in a Virtual Machine", filed Jun. 29, 2010 and issued as U.S. Pat. No. 8,732,670 on May 20, 2014; and U.S. application Ser. No. 12/825,932, titled "Ensuring Deterministic Thread Context Switching in Virtual Machine Applications", filed Jun. 29, 2010 and issued as U.S. Pat. No. 8,499,299 on Jul. 30, 2013. The disclosure of each of the foregoing applications is hereby incorporated by reference in their entirety, including any appendices and attachments thereof, for all purposes.

FIELD OF THE INVENTION

Embodiments of the invention pertain generally to the field of virtual machines, and, more particularly, to preventing non-determinism from affecting the replay of a previously recorded program's execution in a virtual machine environment.

BACKGROUND

It is often desirable to be able to replicate the execution of a computer program in a manner such that the executing program exhibits, during replay, the same behavior that the program exhibited when the program originally executed. For example, a programmer might wish to record a program's behavior in a production environment and then replay that program in a debugging environment in order to locate and fix possible errors in the program code—errors that caused unexpected or undesirable results in the production environment. Under such circumstances, if the program behaves differently when replayed in the debugging environment than the program behaved in the production environment, the programmer may have great difficulty in isolating the source of the problems that were previously encountered.

Among the programs whose behavior it is desirable to replicate are programs that execute in a virtual machine environment. Such programs typically contain bytecode instructions that are interpreted at runtime and executed by a virtual machine that interfaces with the operating system of the physical hardware on which the virtual machine executes. The virtual machine is the entity that executes the machine language instructions in response to the interpretation of corresponding bytecode instructions. The JAVA programming language is an example of a programming language in which such programs may be written, although there are several programming languages that may be used to construct a program that executes in a virtual machine environment.

FIG. 1 illustrates an example of a virtual machine environment 100 in which a program may be executed. An application program 102 contains bytecode instructions that can be interpreted and executed by a virtual machine 104. Virtual machine 104 is capable of interpreting and executing a virtually infinite variety of different application programs, of which application program 102 is but one example. Application program 102 includes instructions that are selected and organized by one or more programmers with the intent of causing a computing device to operate in a specified manner; the choice of how the instructions are organized is up the programmers. Application program 102 may be written in JAVA source code before being compiled into the bytecode instructions that virtual machine 104 executes at run time. The JAVA virtual machine, or JVM, is an example of virtual machine 104. Although the instructions that make up the application programs that are executed by virtual machine 104 will vary from application program to application program, depending on the sets of operations whose performance desired by the programmers of those application programs, virtual machine 104 remains constant.

Virtual machine 104 interfaces with operating system 106. In executing application program 102, virtual machine 104 makes calls into and receives return values from operating system 106. Typically, at least some functionality intended for application program 102 cannot be achieved by virtual machine 104 alone without the participation of operating system 106. The operations performed by virtual machine 104 itself while executing application program 102 will not vary from execution to execution; each time that virtual machine 104 executes application program 102, virtual machine 104 will perform exactly the same operations in response to the bytecode instructions of which application program 102 is made up. Therefore, the behavior of virtual machine 104 is said to be deterministic. Application program 102 is also deterministic in nature. However, virtual machine 104 has no control over the inner workings of operating system 106, and the timing with which operating system 106 responds to virtual machine 104 largely cannot be anticipated. Indeed, different versions of virtual machine 104 may be created to interface with different operating systems, and while the operations of each version of virtual machine 104 will remain consistent between versions (according to the specification of virtual machine 104), the different operating systems with which the different versions of virtual machine 104 interface may behave at least somewhat differently (e.g., in timing) from each other. Thus, the behavior of operating system 106 is non-deterministic. There is no inherent guarantee that operating system 106 will behave in exactly the same manner during separate executions of application program 102, despite the fact that application 102 and virtual machine 104 remain constant during those separate executions.

Theoretically, one might attempt to avoid the problems that arise from this non-determinism by not only recording the operations of application program 102, but also recording all of the operations of virtual machine 104 and operating system 106. Theoretically, one might attempt to simulate, during playback or "replay," each and every operation that any element of environment 100, including virtual machine 104 and operating system 106, performed.

One problem that would likely arise from this theoretical approach pertains to the sheer size of the record that would be produced during recording. The quantity of details that would be recorded and later simulated during replay likely would be so voluminous that the record would occupy an inordinate amount of storage space and would consume inordinate computing resources during replay. The inefficiency produced by the overhead of simulating each and every detail of the operating system's original behavior would likely cause the replay of the application program to be magnitudes slower than the application program's original execution.

An even greater problem with this theoretical approach arises from the fact that no variance whatsoever from the original execution of the application program could be introduced where desired during replay. When each and every operation of the operating system and the virtual machine is replayed, then neither the virtual machine nor any other program is given the opportunity to cause some different behavior in the environment during replay. This inflexibility would make the debugging of the application program during replay a virtual impossibility. Usually, when an application program is being debugged in a virtual machine environment, the virtual machine itself needs to perform at least some operations that the virtual machine did not perform during the application program's original execution. For example, a virtual machine might need to halt (at least temporarily) the application program's execution at a user-specified moment and/or display the values of one or more variables at a user-specified moment so that the person debugging the application program can detect potential errors. Under some circumstances, only the virtual machine will be in a position to cause these temporal effects, and only the virtual machine will possess the information that a person debugging the application program would want to know. When all of the virtual machine's operations during replay are required to duplicate the virtual machine's operations exactly as they were observed during the application program's original execution, this requirement essentially prevents the virtual machine from acting in any sort of debugging capacity.

The approaches described in the section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
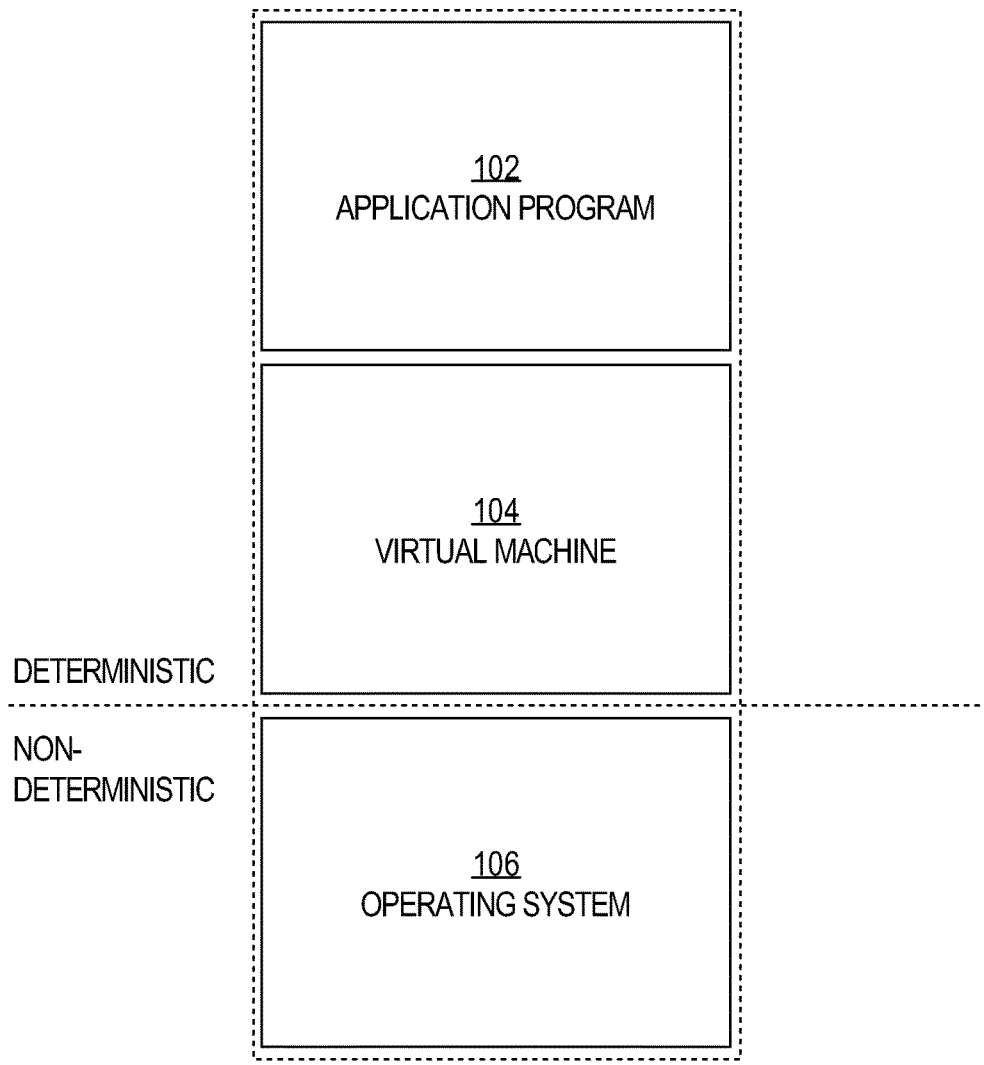
FIG. 1 illustrates an example of a virtual machine environment in which a program may be executed.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques disclosed herein ensure that aspects of an application program's execution which might be subject to non-determinism are performed in a deterministic manner while the application program's execution is being recorded in a virtual machine environment so that the application program's behavior, when played back in that virtual machine environment, will duplicate the behavior that the application program exhibited when originally executed and recorded. Techniques disclosed herein take advantage of the recognition that only minimal data needs to be recorded in relation to the execution of deterministic operations, which actually can be repeated "verbatim" during replay, and that more highly detailed data should be recorded only in relation to non-deterministic operations, so that those non-deterministic operations can be deterministically simulated (rather than attempting to re-execute those operations under circumstances where the outcome of the re-execution might differ) based on the detailed data during replay.

These techniques produce a more compact record of the application program's behavior and a more efficient replay of the application program. Due to the compact record of application program execution generated by these techniques, the execution of even very large and highly complex programs can be recorded and replayed—a feat that might not be possible to achieve if every minute detail of every deterministic operation were also captured and simulated at replay time. Techniques described herein identify specific aspects of an application program's execution (including the application program's and the virtual machine's interactions with the operating system) that are susceptible to non-determinism, and, during replay, simulate (rather than re-execute) these aspects only; the remaining deterministic aspects of the application program's execution are actually re-executed without simulation during replay under the correct assumption that the outcome of re-executing these deterministic aspects will not cause the outcome to vary from the original execution.

Thus, in one embodiment of the invention, not all of the operations performed by the virtual machine are recorded (which would lead to an impractically large and unwieldy record under many circumstances). Instead, in such an embodiment of the invention, the record is dominantly made up of deterministic operations specified by the application program itself, and the virtual machine is simply assumed to behave in the same manner relative to these deterministic operations as the virtual machine did during the application program's original execution. In such an embodiment of the invention, the virtual machine itself is neither recorded nor played back. In such an embodiment of the invention, only the application program itself is played back.

Beneficially, because the virtual machine's behavior is not immutably locked from variance during replay (most operations of the virtual machine itself are not recorded and not replayed; the virtual machine instead merely reacts as it normally would to the application program's replayed deterministic bytecode instructions), the virtual machine is free during replay to perform user-desired debugging functions. Such debugging functionality might include, for example, temporarily halting the execution of the replayed application program at a user-specified moment and/or displaying the values of one or more user-specified variables at a user-specified moment.

Limited Recording and Replaying

In one embodiment of the invention, a recording mechanism records only selected bytecodes of the executing application program during "record time." A replay mechanism then plays back (e.g., to the virtual machine), during "replay time," all of the bytecodes that were recorded by the recording mechanism during record time. Therefore, in one embodiment of the invention, not all of the bytecodes of the executing application are recorded during record time. Bytecodes that are known to behave deterministically (their behavior will never produce different results from execution to execution) do not need to be recorded or stored separately from the application program itself. To replay these deterministic bytecodes during replay time, the virtual machine merely re-executes the application program.

During replay time, bytecodes that are not known to behave deterministically may be modified by the replay mechanism, using information that was recorded during record time, prior to playing the modified bytecodes back to the virtual machine. The modification generally ensures that the effects caused by the execution of those bytecodes during record time will also be caused by the execution of the modified bytecodes during replay time. Without such modification, there is no guarantee that simple re-execution of the non-deterministic bytecodes would produce the same effect during replay time.

Example Recording and Replay Mechanism Implementation

Although other implementations may vary, in one embodiment of the invention, both the recording mechanism and the replay mechanism are implemented as a JAVA agent called the "replay core." In one embodiment of the invention, the replay core is implemented as a dynamic link library (DLL) that executes within the same process as the JAVA virtual machine. The replay core has the same access privileges as the virtual machine itself.

In one embodiment of the invention, the replay core communicates with the virtual machine through two of the virtual machine's application programming interfaces (APIs): the Tools Interface (TI), and the JAVA Native Interface (JNI). TI is typically used by debugging modules, and provides low-level access to data. JNI is a fairly common API used by many JAVA application programs. Because the virtual machine provides the replay core with mechanisms for accessing and setting data through these APIs, techniques described herein do not require any modification of the virtual machine itself.

During recording time, when the virtual machine loads any class, TI produces a corresponding event for which the replay core listens. The replay core registers interest in a specified set of events which are potentially non-deterministic in nature. During recording time, whenever the replay core detects an event from the specified set of events, the replay core performs actions needed to ensure that the replay process will be deterministic. For example, the replay core may "hijack" certain function calls in order to cause the values that are produced by the called functions to be observed and to be emitted into a replay stream for later consumption. More specifically, the replay core may modify the bytecodes of certain classes at the time that those classes are initially loaded by the virtual machine during record time. The replay core may modify the bytecodes of these classes in order to cause the objects instantiated from these classes to emit the same function-produced values when those functions are subsequently called during record time, for example. Further examples of some of the actions that the replay core performs to this end are described in further detail below.

Loading, Linking, and Initialization

The JVM makes types (e.g., classes) available to the running program through a process of loading, linking, and initialization. Loading is the process of bringing a binary form for a type into the JVM. Linking is the process of incorporating the binary type data into the runtime state of the virtual machine. Linking is divided into three sub-steps: verification, preparation, and resolution. Verification ensures the type is properly formed and fit for use by the JVM. Preparation involves allocating memory needed by the type, such as memory for any class variables. Resolution is the process of transforming symbolic references in the constant pool into direct references. Implementations may delay the resolution step until each symbolic reference is actually used by the running program. After verification, preparation, and (optionally) resolution are completed, the type is ready for initialization. During initialization, the class variables are given their proper initial values.

Class Loading

The JAVA class loader is a part of the JAVA Runtime Environment. The JAVA class loader dynamically loads JAVA classes into the JAVA Virtual Machine. A software library is a collection of object code. In the JAVA language, libraries are typically packaged in JAR files. JAR files are typically compressed and contain JAVA classes. A class is a named unit of code. The class loader is responsible for locating libraries, reading their contents, and loading the classes contained within the libraries.

In JAVA, applications are permitted to implement custom class loaders. A class loader may load the bytecodes for a corresponding class in any of a variety of ways. For example, a class loader may read the class's bytecodes from a hard disk drive of the computing device on which the class loader executes. For another example, a class loader may read the class's bytecodes over a network interface from another computing device that is separate from the computing device on which the class loader executes. For yet another example, the class loader may dynamically generate the class's bytecodes "on the fly" without reading those bytecodes from any source.

Class loaders can be categorized into three tiers. One tier includes the bootstrap class loader. Another tier includes the extension class loader. Yet another tier includes the system class loader. These class loaders form a kind of hierarchy, in that the bootstrap class loader is the parent of the extension class loader, and the extension class loader is the parent of the system class loader. In at least some environments, the bootstrap class loader is a native class loader (it is implemented in code that is not executed by the virtual machine), while the other class loaders are not native class loaders (they are implemented in code that is executed by the virtual machine).

The bootstrap class loader performs operations before the replay core is loaded. Therefore, the bootstrap class loader may perform operations over which the replay core cannot exert any control or influence. The bootstrap class loader is inherently non-deterministic. Many core JVM classes, such as java.lang.String, are loaded by the bootstrap class loaded before the JVM is fully initialized and can execute JAVA code (including the replay core). According to one embodiment of the invention, these core JVM classes loaded by the bootstrap class loader are instrumented in such a way that causes these core JVM classes to be executed in a deterministic manner. In one embodiment of the invention, all of the core JVM classes that loaded before the loading of the replay core are statically instrumented and stored in a JAR file called "ReplayJVM.jar." This JAR file is pre-pended to the boot class path so that when the JVM is loading the core JVM classes, the JVM finds the classes within ReplayJVM.jar instead of within the JVM JAR files. Additionally, after ReplayJVM.jar has been created for a particular application program, the same ReplayJVM.jar file is used during subsequent recordings of that particular application program (instead of recreating the ReplayJVM.jar file on each subsequent recording) as long as the JAVA Development Kit ("JDK") and JAVA Runtime Environment ("JRE") that were used to create the ReplayJVM.jar file are the same as those that are being used during the subsequent recordings. Furthermore, in one embodiment of the invention, the same ReplayJVM.jar file that was used during the recording of a particular application program is also used during the replay of that particular application program.

In a JAVA environment, the extension and system class loaders are implemented in JAVA code. According to techniques described herein, the replay core takes measures to ensure that any class loading operation performed by the extension or system class loaders during record time is duplicated exactly during replay time. Such class loading operations may involve file input/output operations and data decompression operations, for example.

In one embodiment of the invention, during record time, whenever a class is loaded, TI generates a "classFileLoad-Hook" event. The replay core listens for and intercepts these events. At the time that such an event is intercepted, the JVM is in possession of the loaded class's bytecodes. In response to intercepting such an event, the replay core calls a "transformClass" function that is implemented in the replay core. The replay core passes the loaded class's bytecodes as input to the transformClass function. The transformClass function modifies the loaded class by injecting specified bytecodes into the class. These injected bytecodes generally ensure that values produced by instances of the class during record time also will be produced by the class' instances during replay time. The transformed class, containing the injected bytecodes, is then returned and stored in a local cache of the computing device on which the application is executing. Thereafter, all instances of the class are instantiated from the transformed class.

As the transformClass function examines a class's bytecodes in order to perform bytecode injection, the transformClass function may "walk" the class hierarchy to determine whether that class inherits from one or more other classes. Other classes in the hierarchy may be loaded as a result. Each time such another class is loaded, a "getResourceAsStream" method of that other class's class loader is invoked. The transformClass function may therefore cause invocations of several different classes' getResourceAsStream methods during record time.

Each class loader's getResourceAsStream method accepts, as input, a string that identifies a name of a resource (e.g., a class) that is to be loaded. In one embodiment of the invention, during record time, the replay core listens for and intercepts each invocation of the getResourceAsStream method of each class loader. The replay core replaces the invocation of each class loader's getResourceAsStream method with an invocation of the replay core's own (different) implementation of the getResourceAsStream method. The replay core's getResourceAsStream method accepts, as input, both (a) an Object that identifies the class loader whose method invocation was intercepted (the "class loader object"), and (b) a string that identifies the same resource name that the class loader's method invocation's input identified (the "resource string").

The replay core's getResourceAsStream method determines whether the value of the class loader object is "null." If this value is null, then the original getResourceAsStream method invocation that the replay core intercepted belonged to the bootstrap class loader. Under such circumstances, the replay core's getResourceAsStream method performs its own custom lookup of the resource identified by the resource string.

Alternatively, if the class loader object's value is not null, then the original getResourceAsStream method invocation that the replay core intercepted belonged to some class loader other than the bootstrap class loader (e.g., the extension class loader or the system class loader). Under such circumstances, the replay core's getResourceAsStream method performs actions that ensure that the class loading operations can be replayed deterministically during replay time. These actions ensure that the class loading operations will be performed during replay time in the same order in which those class loading operations were performed during record time. These actions, according to one embodiment of the invention, are described below.

In one embodiment of the invention, the actions that the replay core's getResourceAsStream method performs include the following. First, the replay core's getResourceAsStream method records a "getResourceStart" marker by emitting a corresponding code into the replay stream. Next, the replay core's getResourceAsStream method records, by emitting into the replay stream, (a) the value of the resource string (i.e., the name of the class that is being loaded) and (b) a class loader index of the class loader identified by the class loader object. Each non-bootstrap class loader instance has an associated class loader index that the replay core assigns to that class loader instance when the class loader instance is first used. Next, the replay core's getResourceAsStream method calls the getResourceAsStream method of the original class loader that is identified in the class loader object. The resource string is passed as input to the original class loader's getResourceAsStream method. The invocation of the original class loader's getResourceAsStream method ensures that the resource identified actually will be loaded during record time, so as not to disrupt the application's execution. Finally, after the original class loader's getResourceAsStream method has completed, the replay core's getResourceAsStream method records a "getResourceEnd" marker by emitting a corresponding code into the replay stream.

As a consequence of the foregoing actions, the replay stream contains a demarcated, ordered sequence of items. Each such item indicates (a) a resource name of a resource that was loaded and (b) a class loader index of the class loader that was used to load that resource. The information in the replay stream therefore can be used to replay the class loading operations in identical order during replay time.

During replay time, whenever a class is loaded, TI again generates a "classFileLoadHook" event. The replay core again listens for and intercepts these events. Again, in response to intercepting such an event, the replay core calls the transformClass function. However, during replay time, the transformClass function does not perform any bytecode injection as the transformClass function did during record time; if the transformClass function attempted to do so, then it might inadvertently load one or more classes that did not exist during record time, which could cause an inconsistent replay. During replay time, instead of modifying a class, the transformClass function finds the previously modified class in the local cache, where the modified class was previously stored during record time, as mentioned above. Because the transformClass function does not again "walk" the class hierarchy during replay time (this being unnecessary because the class has already been modified), the getResourceAsStream method invocations that were made during record time will not be automatically repeated as a result of such "walking." However, if the same getResourceAsStream method invocations that were made during record time are not also made during replay time, then operations that were performed by those getResourceAsStream method invocations during record time might not be performed during replay time, potentially resulting in an incorrect replay of the application. The operations performed by getResourceAsStream method invocations may change the application state.

Therefore, in one embodiment of the invention, during replay time, even though the transformClass function finds and uses the previously modified class in the local cache and does not "walk" a class's hierarchy as during record time, the transformClass function reads the getResourceAsStream method invocations from the replay stream (in the same order in which they were written to the replay stream during record time) and simulates those getResourceAsStream method invocations. In order to simulate a getResourceAsStream method invocation, the replay core invokes its own getResourceAsStream method, passing, as input to the method, the corresponding class loader index and resource name from the replay stream. As is discussed above, under circumstances in which the input-identified class loader is not the bootstrap class loader, the replay core's getResourceAsStream method invokes the class loader's getResourceAsStream method, passing the resource name as input. As a result, the operations that were performed by getResourceAsStream method invocations during record time are also performed during replay time, and in the same order.

As is mentioned above, in one embodiment of the invention, during record time, the transformClass function modifies a class's bytecodes and then stores the modified class in the local cache. However, in one embodiment of the invention, before modifying a class's bytecodes in this manner, the transformClass function first attempts to find the already modified class in the local cache. If the transformClass function finds the already modified class in the local cache, then the transformClass function does not attempt to modify the class again. As a result, at least some classes might only need to be modified during the initial recording of the application; during any subsequent recordings, the bytecodes of those modified classes will already be found in the local cache, which may be located on a persistent storage device such as a hard disk drive.

An application might define an "extensions directory." The application may place, into the extensions directory, JAR files that are to be put on the bootstrap class path. Because the JAR files are within the bootstrap class path, a native class loader will find the classes within those JAR files on disk. Such classes cannot simply be loaded from the repository because the classes are loaded by the bootstrap class loader. In one embodiment of the invention, the replay core copies JAR files that are in the bootstrap class path into the repository. The replay code additionally ensures that the bootstrap class path parameter is set in such a manner so that the native class loader can find the JAR files.

Figure 2A:
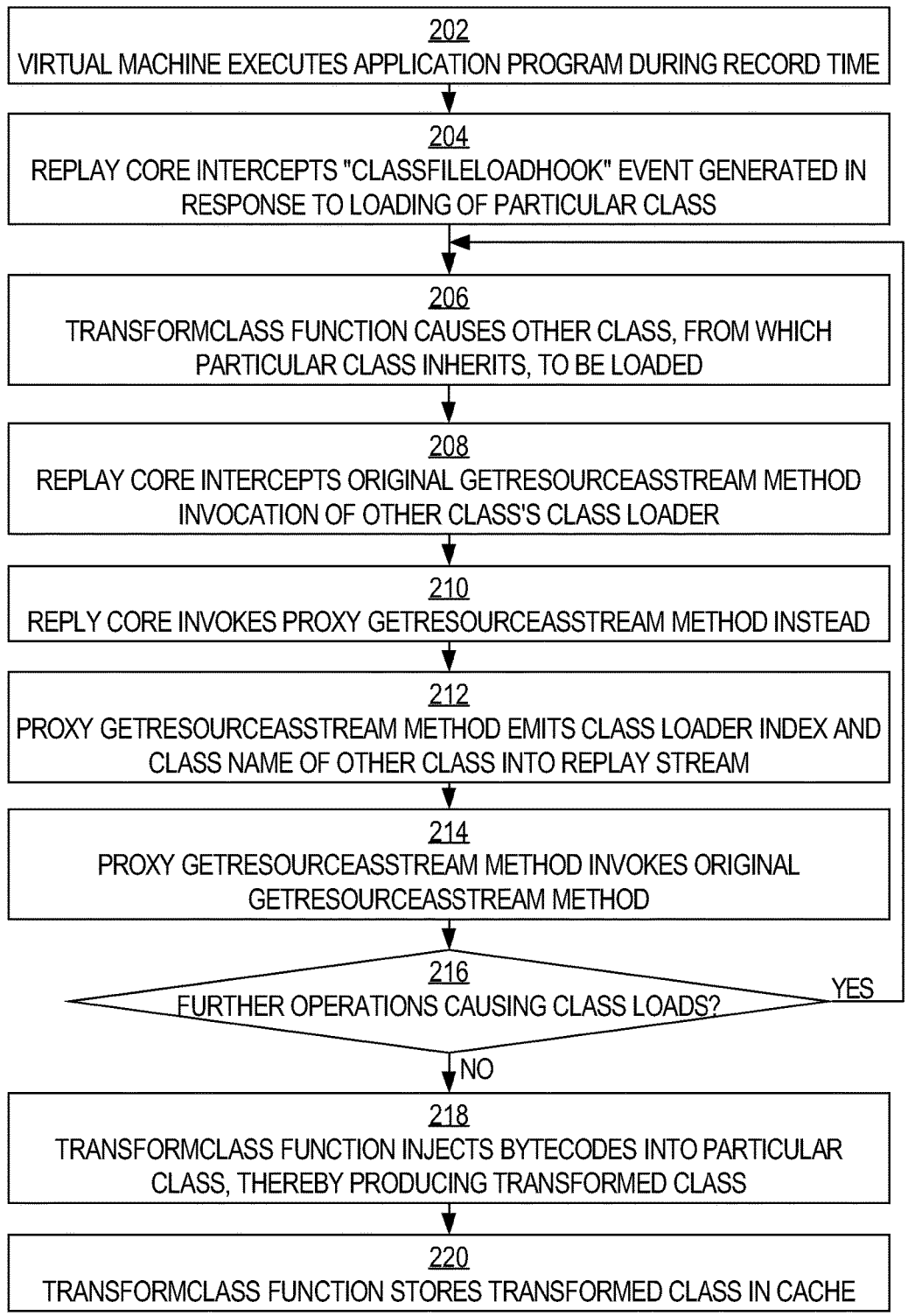
FIGS. 2A and 2B are flow diagrams that illustrate an example of a technique for ensuring that class loading operations will be performed in a deterministic manner on replay of an application, according to an embodiment of the invention.
Figure 2B:
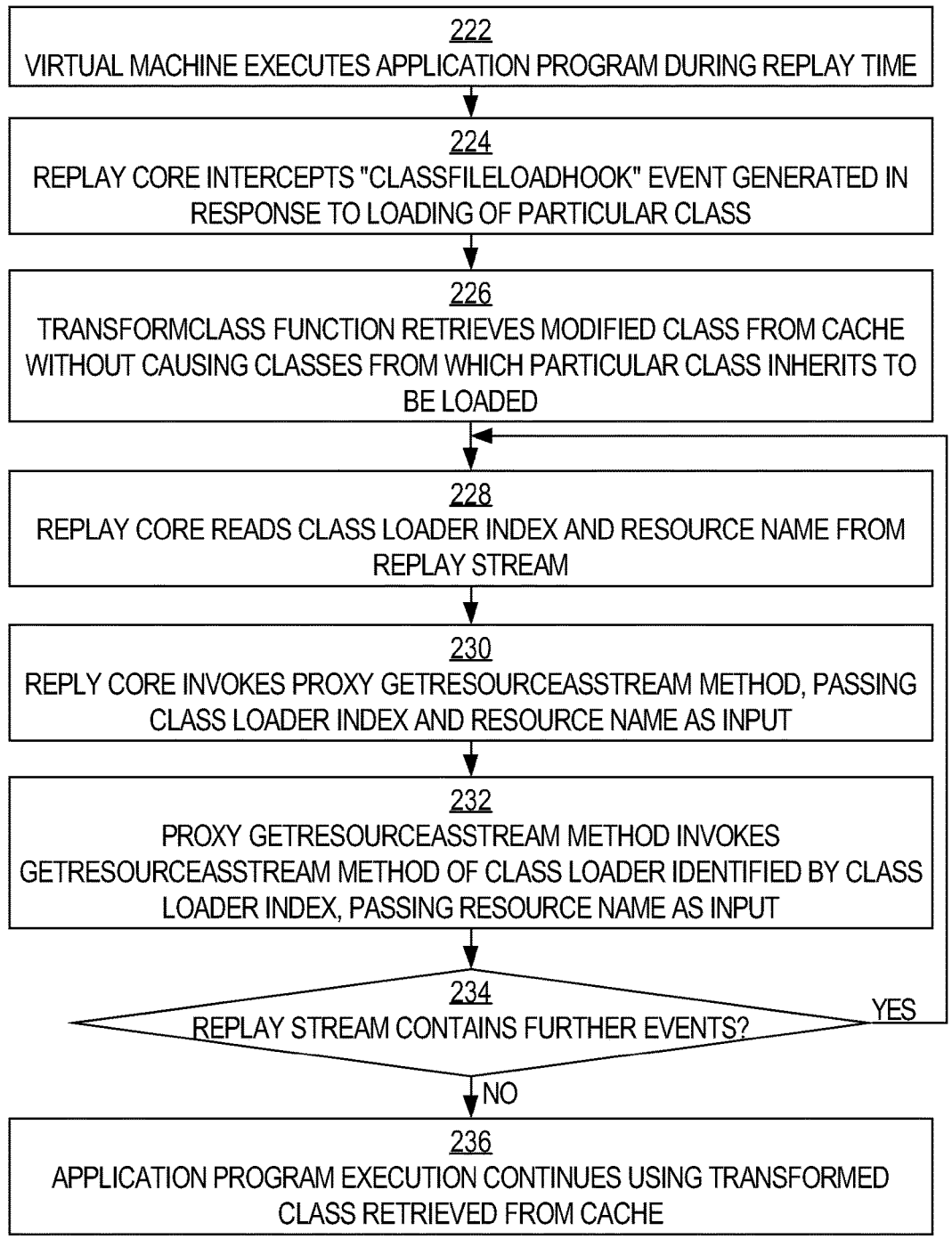

FIGS. 2A and 2B are flow diagrams that illustrate an example of a technique for ensuring that class loading operations will be performed in a deterministic manner on replay of an application, according to an embodiment of the invention. FIG. 2A illustrates a portion of the class loading technique that is performed during record time. In block 202, an application program is executed by a virtual machine during record time. In block 204, a replay core intercepts a "classFileLoadHook" event that was generated in response to the loading of a particular class. In block 206, a transformClass function causes another class, from which the particular class inherits, to be loaded. In block 208, the replay core intercepts an original getResourceAsStream method invocation of the other class's class loader. In block 210, the replay core invokes a proxy getResourceAsStream method instead of the original getResourceAsStream method. In block 212, the proxy getResourceAsStream method emits, into a replay stream, both (a) a class loader index of the other class' class loader and (b) a resource name that identifies the other class. In block 214, the proxy getResourceAsStream method invokes the original getResourceAsStream method, passing the resource name as input. In block 216, the transformClass function determines whether any operations, which will cause additional other classes to be loaded, need to be performed. If such other operations need to be performed, then control passes back to block 206. Otherwise, control passes to block 218.

In block 218, the transformClass function injects bytecodes into the particular class, thereby producing a transformed class. In block 220, the transformClass function stores the transformed class in a local cache.

FIG. 2B illustrates a portion of the class loading technique that is performed during replay time. In block 222, the application program is executed by the virtual machine during replay time. In block 224, the replay core intercepts a "classFileLoadHook" event that was generated in response to the loading of the particular class. In block 226, the transformClass function retrieves the modified class from the local cache without causing any other class, from which the particular class inherits, to be loaded. In block 228, for a next one of the other classes that the transformClass function caused to be loaded during record time in block 206, the replay core reads, from the replay stream, the class loader index and resource name which was emitted in connection with that other class during record time in block 212. In block 230, the replay core invokes the proxy getResourceAsStream method, passing the class loader index and resource name as input. In block 232, the proxy getResourceAsStream method invokes the getResourceAsStream method of the class loader that is identified by the class loader index, passing the resource name as input. In block 234, the replay core determines whether the replay stream contains data for any further class loading events that the transformClass method caused during record time in block 206. If the replay stream contains data for such further class loading event, then control passes back to block 228. Otherwise, control passes to block 236.

In block 236, the application's execution continues using the transformed class that the transformClass function retrieved from the local cache in block 226 instead of the particular class.

Class Verification

After a class has been loaded by the JVM, the JVM performs linking relative to the class. Part of the linking process involves verification. During the verification process, the JVM authenticates the class bytecodes and determines whether the class bytecodes are valid JAVA code.

At the time that an instance of a class is created (or "instantiated"), the loading and linking process is triggered relative to that class. Class loading also may be performed without linking.

During the verification process, the JVM inspects each method of the class being verified a method at a time. If a method involves a field "A" being assigned a value "B," for example, then the JVM performs type safety checking in order to ensure that "A" and "B" are objects of related types. If the JVM determines that the objects are not of related types, then the JVM returns an error and prevents the application from executing. The JVM cannot perform this type safety checking in the first place until the JVM has loaded the classes of both objects "A" and "B." Therefore, the verification process causes class loading to be performed.

The part of the JVM that performs the verification process is called the "verifier." The verifier's code is deterministic. The time at which verification begins relative to a class is deterministic. However, the order in which a class's methods are verified is non-deterministic. Between one execution of an application program and the next, the order in which the same class's methods are verified may differ. Because the verifier may verify a class's methods in a non-deterministic order, and because verification may cause other classes to be loaded (as discussed byway of the assignment example above), the order in which classes are loaded during the verification process is also non-deterministic.

The replay core cannot control the native side of the computing environment in which the application program is executing. The replay core cannot command the native side of the computing environment to verify a class's methods in any specified order. However, through an embodiment of the invention described herein, the replay core does cause the classes loaded during the verification process to be loaded in a deterministic order. Consequently, when the application program is executed during replay time, the classes loaded during the verification process are loaded in the same order in which those classes were loaded during the verification process when the application program was executed during record time.

According to one embodiment of the invention, during record time, the replay core detects when the class verification process starts and when the class verification process ends. The replay core records all class loading events that occur in between the starting and ending of the verification process. In one embodiment of the invention, the replay core records the class loading events by emitting these events into the replay stream. More specifically, in one embodiment of the invention, the replay core emits both (a) the loaded class's name and (b) the class loader index of the class loader that loaded the class.

During replay time, the replay core again detects when the class verification process starts. Upon detecting that the class verification process has started, the replay core causes the classes identified by the recorded class loading events to be loaded in the same order in which those classes were originally loaded during record time. The replay core additionally saves and stores, in a local cache, the class objects that are returned by the class loading process. Later, when the verifier attempts to cause any of those classes to be loaded during replay time, the replay core intervenes in the attempt and causes the corresponding class object to be retrieved from the cache and returned to the verifier, so that the verifier does not cause the class to be re-loaded. Thus, classes are loaded earlier than usual during replay time (before the verifier has an opportunity to cause the classes to be loaded), but no extra class loading is performed.

As is discussed above, in one embodiment of the invention, the replay core detects when the class verification process starts. Techniques described herein enable the replay core to detect the starting of the class verification process. According to one embodiment of the invention, at the time that a class is loaded by the JVM during record time, the replay core injects a bytecode into each method of that class. The injected bytecode essentially represents the following source code:

if (0) {replayVerifierField=replayVerifierBase.o;}

The injected bytecode costs minimal overhead. Because the condition of the "if" statement always evaluates to "false" at runtime, the assignment never occurs, and the runtime flow of the application program is not corrupted by the injection. According to one embodiment of the invention, "replayVerifierField" in the foregoing representative source code is an extra field that is injected into every class at the time that such a class is loaded. Each injected replayVerifierField field has a unique class. That unique class inherits from the class of replayVerifierBase; hence, verification will pass. Additionally, the name of the unique class contains the name of the class into which the replayVerifierField was injected. Consequently, at the time that the loading of the replayVerifierField class is intercepted, the name of the class being verified can be determined and derived from the class name of replayVerifierField's unique class.

However, before runtime, while the JVM is performing verification, the verifier will detect that the method contains an assignment. The verifier will perform type safety checking to ensure that the fields are of related types. In order to perform this type safety checking, the verifier will cause classes that contain the fields to be loaded (if those classes have not already been loaded). The class of "replayVerifierBase" is defined in the ReplayJVM.jar file, which will already have been loaded by the bootstrap loader. The verifier will determine that the class of "replayVerifierField" has not been loaded yet, and will cause that class to be loaded.

The replay core listens for events that indicate that a class is being loaded. In one embodiment of the invention, bytecodes are injected beforehand into each "load class" method so that the method generates a distinct event. As a result, that distinct event is generated whenever a class is loaded. By listening for occurrences of that distinct event, the replay core detects that a class is being loaded. In response to determining that a class is being loaded, the replay core determines which class is being loaded. In response to determining that the class being loaded is the class of "replayVerifierField," which will be loaded during the verification process, the replay core determines that the verification process has started. As is discussed above, beginning at that moment, the replay core records each class load event that occurs until the replay core detects that the verification process has ended. The class of "replayVerifierField" will only be loaded once.

In one embodiment of the invention, the replay core detects that the verification process has ended in response to either of two events. One of these events occurs when a class is prepared. When a class is prepared during the class preparation phase of the linking process, TI generates a "class prepared" event. Because the class preparation phase necessarily begins after the class verification phase has finished, the replay core's detection of this event indicates to the replay core that the verification process has already ended.

The other of these events occurs when a class fails verification during the verification process. When a class fails verification, the JVM throws an exception, but the application program's execution will not be halted in response. At some point later in time, the application program code will catch this exception. The exception may be a "verify" exception or a "no class defined" exception. According to one embodiment of the invention, during record time, the replay core injects specified bytecodes into each "catch" block (the block of code that catches and handles an exception) in the application program code during the class loading process. The specified bytecodes may cause a distinct event to be generated, for example. If the replay core detects that this distinct event has been generated, then this signifies to the replay core that one of the exceptions named above has been thrown and caught. The verification process necessarily has completed by the time that such an exception has been caught. Therefore, in response to detecting that one of these exceptions has been caught, the replay core determines that the verification process has already ended.

During replay time, the replay core again listens for occurrences of the distinct event that signifies that a class is being loaded. In response to determining that a class is being loaded, the replay core determines which class is being loaded. In response to determining that the class being loaded is the class of "replayVerifierField," the replay core determines that the verification process has started once again (this time during replay time rather than record time).

After determining, during replay time, that the verification process has started again, the replay core reads, from the replay stream, for each class load event emitted to the replay stream during the verification process during record time, both (a) the loaded class's name and (b) the class loader index of the class loader that loaded the class. The replay core invokes the "load class" method of each such class loader, passing the name of the class to be loaded as input. This causes the same classes that were loaded during the verification process at record time to be loaded during the verification process at replay time, and in the very same order. As a result, classes loaded during the verification process are loaded in a deterministic manner, thereby eliminating variance between record and replay. For each class object returned by a class loader during this process, the replay core stores that class object in a local cache.

After the replay core has caused the classes to be loaded deterministically in the above manner at the beginning of the verification process during replay time, before the verifier has had a chance to load any classes, the verifier continues as usual. The verifier attempts to load classes in a potentially non-deterministic manner. In one embodiment of the invention, the replay core listens for and intercepts each class loading event that the verifier triggers. When the replay core detects such a class loading event, the replay core determines which class the verifier was attempting to load, and, instead of permitting the class to be loaded, returns to the verifier the corresponding class object that was stored in the local cache when that class was loaded previously. Thus, no extra class loads are performed.

Figure 3A:
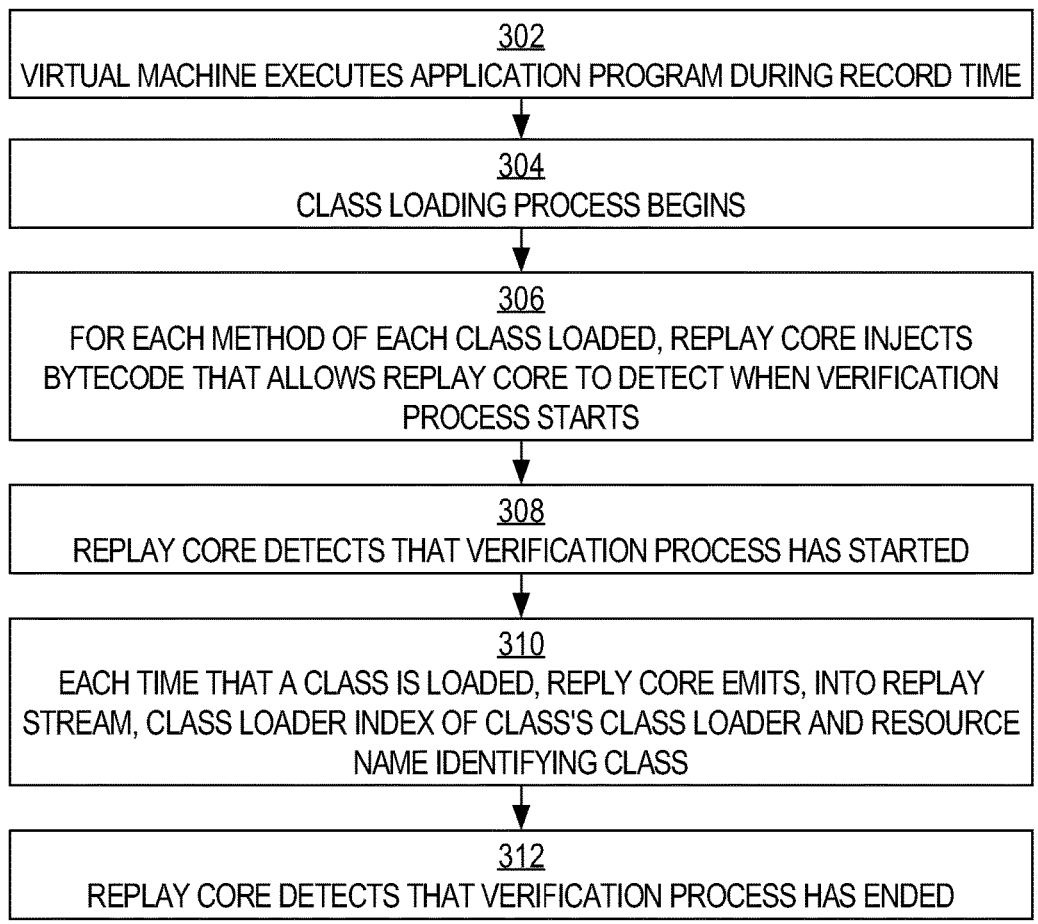
FIGS. 3A and 3B are flow diagrams that illustrate an example of a technique for ensuring that classes that the verifier loads in a particular order during record time also will be loaded in that particular order during the verification process at replay time, according to an embodiment of the invention.
Figure 3B:
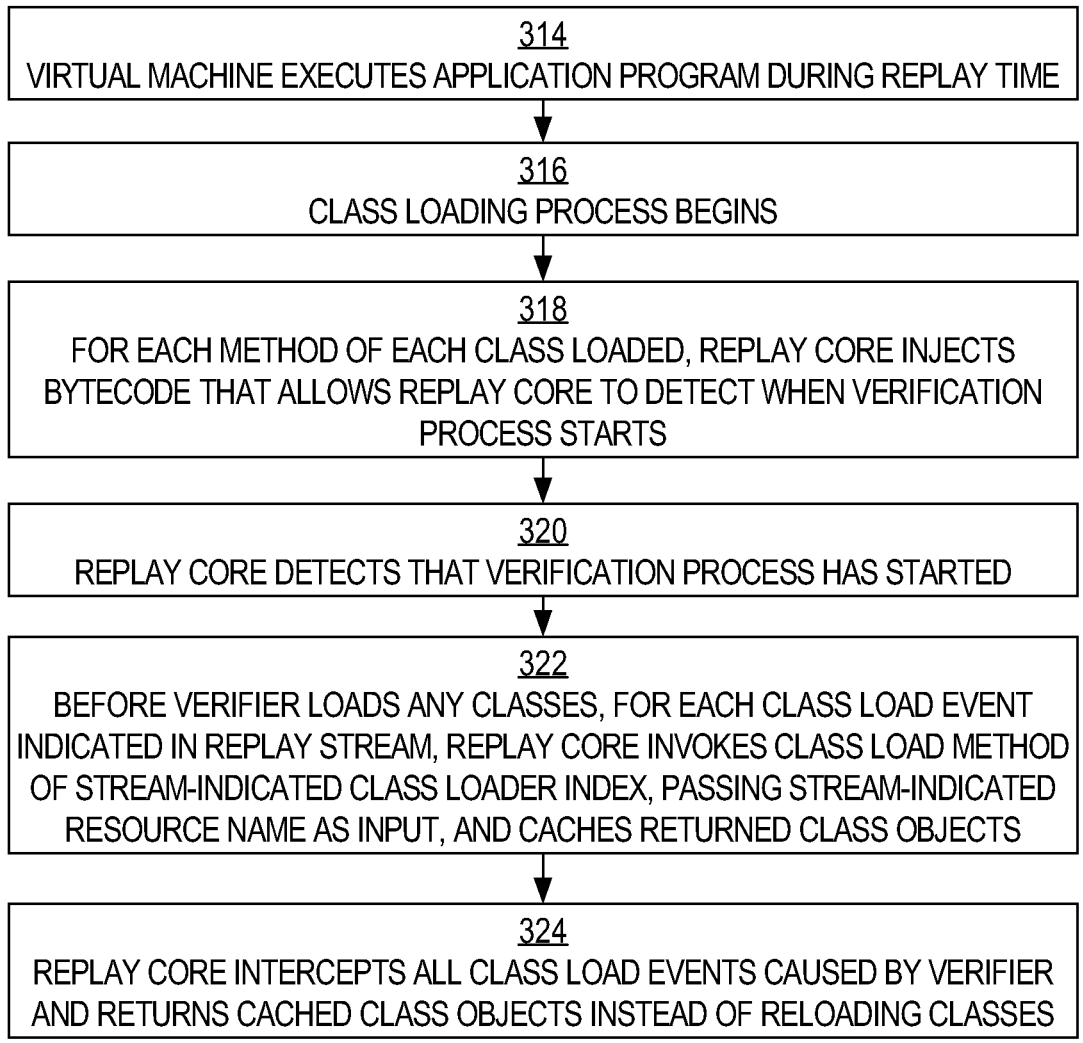

FIGS. 3A and 3B are flow diagrams that illustrate an example of a technique for ensuring that classes that the verifier loads in a particular order during record time also will be loaded in that particular order during the verification process at replay time, according to an embodiment of the invention. FIG. 3A illustrates a portion of the class verification technique that is performed during record time. In block 302, an application program is executed by a virtual machine during record time. In block 304, the class loading process begins. In block 306, for each method of each class that is loaded, a replay core injects a bytecode that allows the replay core to detect when the verification process starts. In block 308, the replay core detects that the verification process has started. In block 310, each time that the verifier causes a class to be loaded, the replay core emits emits, into a replay stream, both (a) a class loader index of the class' class loader and (b) a resource name that identifies the other class. In block 312, the replay core detects that the verification process has ended.

FIG. 3B illustrates a portion of the class verification technique that is performed during replay time. In block 314, the application program is executed by the virtual machine during replay time. In block 316, the class loading process begins. In block 318, for each method of each class that is loaded, the replay core injects a bytecode that allows the replay core to detect when the verification process starts. In block 320, the replay core detects that the verification process has started. In block 322, before the verifier has a chance to load any classes, for each class load event in the replay stream that occurred during the verification process at record time, the replay core invokes the "class load" method of the stream-indicated class loader, passing the stream-indicated class name as input, thereby causing that class to be loaded (and in the same order as during record time). The replay core stores each class object returned by each class loader in a local cache. In block 324, after the replay core has caused all of the classes that were loaded during the verification process at record time to be loaded in the same order as during record time, the replay core intercepts all class load events caused by the verifier, prevents those classes from being loaded again, and returns to the verifier the cached class objects that would have resulted from the class loading.

Enforcing Single Thread Execution Via Global Application Lock

After classes have been loaded and verified in the manner discussed in the previous sections, the classes are initialized. The discussion of class initialization techniques below is understood in the context of a locking mechanism that is implemented in the replay system. According to one embodiment of the invention, in order to ensure that an application program executes in a deterministic manner, so that its behavior during replay time will be the same as its behavior was during record time, the replay core allows only one thread of the application program to execute at any given time. Before a thread of the application program is permitted to execute, the replay core requires that thread to obtain a global application lock. Only one instance of the global application lock exists, and only one thread can hold the global application lock at any given time. When a currently executing thread's execution time slice has expired, that thread releases the global application lock and allows other threads to awaken and obtain the global application lock.

Any time that a thread makes a blocking call, that thread is required to release the global application lock; otherwise, no other thread would be able to execute, and a deadlock condition would arise.

Class Initialization

If a class declares any static fields (fields that are declared as being static, in that all objects instantiated from that class will share the same copy of those fields instead of having their own separate copies) or contains any static code blocks, then, when the class is compiled, all of the static field declarations and all of the static code blocks within the class will be placed within the body of a static initializer method of the class. The static initializer method is named "<clinit>." Before an application program is allowed to access any other parts of a class containing a <clinit> method, the JVM executes the <clinit> method of that class if the <clinit> method of that class has not yet been executed.

When the JVM starts executing the <clinit> method of a class, the JVM obtains a JVM-internal class lock on that class. The JVM does not generate any event in response to obtaining the class lock. The <clinit> method may, in some cases, contain a blocking call. Under such circumstances, the thread in which the <clinit> method is executing releases the global application lock (discussed above) before blocking, so that other threads can obtain the global application lock. Another thread might then obtain the global application lock. It is possible that this other thread might attempt to access or instantiate the same class in which the <clinit> method made the blocking call. If this occurs, then the JVM will attempt to obtain a class lock on the same class again, undesirably producing a deadlock condition. There is no natural mechanism for detecting when such a deadlock condition occurs.

The JVM's invocation of class's<clinit> method can be triggered in several different ways. For example, a class A might look like the following:

```
class A {
    public static int i = 0;
    void static inc {
        i++;
    }
}
And a class B might look like the following:
class B {
    A.i = 10;
    A.inc( );
    A a = new A;
}
```

Although not shown in the JAVA source code for class A, the bytecodes for class A generated by the JAVA compiler will include a <clinit> method that may have some non-empty body.

Under such circumstances, execution of the code "A.i=10" causes a static field access of class A by class B. The static field access in the foregoing example causes field "i" of all instances of class A to be assigned the value "10." The JVM invokes the <clinit> method of class A in response to such a static field access.

Additionally, execution of the code "A.inc" causes a static method access of class A by class B. The static field access in the foregoing example causes field "i" of all instances of class A to be incremented by one. The JVM invokes the <clinit> method of class A in response to such a static method access.

Furthermore, execution of the code "A a=new A" causes a new instance of class A (that is, an object having class A as its type) to be instantiated. The JVM invokes the <clinit> method of class A in response to such an instantiation of class A. Therefore, three different kinds of operations that will cause the JVM to invoke a class's<clinit> method are described above. Any of these kinds of operations might potentially cause a deadlock if certain conditions (discussed above) are present when these operations are attempted.

Techniques described below prevent such deadlock conditions from occurring. In one embodiment of the invention, the replay core inspects each class prior to class initialization. If the replay core discovers a <clinit> method within a class, then the replay core performs several operations relative to the class.

First, the replay core renames the <clinit> method to "replay_clinit_[classname]" (in the above example, [classname] would be "A," making the method's new name "replay_clinit_A"). In one embodiment of the invention, the replay core then injects an empty <clinit> method into the class. For each static code block (i.e., any block of code that is declared as being static) within the class, the replay core also injects, before any other code within that static code block, an invocation of a method called "replay_check_clinit." The replay core additionally injects the replay_check_clinit method into the class that contains the static code block. The replay_check_clinit method internally determines whether a value of a Boolean variable of the class is "true" or "false." If the value of the Boolean variable is "false," then this indicates that the replay_clinit_A method of the class has not yet been executed. If the replay_check_clinit method determines that the value of the Boolean variable is "false," then the replay_check_clinit method invokes the replay_clinit_A method of the class and sets the value of the Boolean variable to "true." Alternatively, if the replay_check_clinit method determines that the value of the Boolean variable is already "true," then the replay_check_clinit method returns without doing anything further. The injection of the replay_check_clinit method invocation at the beginning of each static code block takes care of cases in which <clinit>'s invocation would be triggered due to a static method access (as in the "A.inc" example above).

Second, the replay core determines whether the class contains any instance initializer, or "constructor"—this contains code that is executed when an instance of the class is instantiated (in contrast to the code in the <clinit> method, which is executed when the class itself is initialized, prior to any instantiation of the class). A class's constructor is typically named "<init>." If the class contains such a constructor, then the replay core injects, before any other code within that constructor, an invocation of the replay_check_clinit method discussed above. The injection of the replay_check_clinit method invocation at the beginning of the body of each constructor takes care of cases in which <clinit>'s invocation would be triggered due to object instantiation (as in the "A a=new A" example above).

Third, the replay core maintains a set of all of the classes into which the replay core has injected any replay_check_clinit method invocation. The replay core inspects each other class (into which the replay core has not yet injected any replay_check_clinit method invocation) to determine whether that other class contains any static field access of any field of any class in the set (as in the "A.i=10" example above). In response to determining that another class contains such a static field access, the replay core injects, prior to any static field access contained in the body of that other class, an invocation of replay_check_clinit into which the identity of the accessed class is passed as input. For example, if the static field access is located in class B, and if the static field access accesses static field i of class A, then the replay core injects "replay_check_clinit(A)" into the body of class B above and before any static field access contained in the body of class B. The replay core injects a separate replay_check_clinit method invocation into a particular class' body for each other class on which the particular class performs a static field access. Where a class name is passed as a parameter to replay_check_clinit, replay_check_clinit performs the operations discussed above relative to the named class. The injection of the replay_check_clinit method invocation at the beginning of the body of each constructor takes care of cases in which <clinit>'s invocation would be triggered due to static field access (as in the "A.i=10" example above).

In the JAVA programming language, static methods of a class also can be invoked using reflection. Therefore, in one embodiment of the invention, the replay core also inspects each class for code that performs, using reflection, a static method access relative to any class in the set. In one embodiment of the invention, each class that performs such a static method access using reflection will contain the "Class.forName( )" function, and the name of some other class will be specified as an input parameter to that function. In one embodiment of the invention, in response to determining that the particular class that is specified as an input parameter to the Class.forName( ) function is contained in the set discussed above (the set of classes into which a <clinit> method invocation has been injected), the replay core injects, into the Class.forName( ) function, a <clinit> method invocation into which the name of the particular class is passed as input. In one embodiment of the invention, a separate <clinit> method invocation is injected into the Class.forName( ) function for each separate class relative to which a static method invocation is performed using reflection.

As a result of the foregoing operations, whenever the JVM invokes a class's <clinit> method, the injected empty <clinit> method instantly returns without performing any blocking call that the original <clinit> method otherwise might have performed (such a blocking call would still be contained within the renamed replay_clinit method). The JVM therefore operates under the assumption that the class has been initialized, and releases the class lock on the class, allowing another thread to obtain the class lock on the class if needed. This avoids the potential deadlock conditions discussed previously. The invocation of the class's replay_clinit method (which does not cause the JVM to obtain any class lock on the class) by the replay_check_clinit method actually initializes the class. As is discussed above, invocations of the replay_check_clinit method are injected at all execution points at which the JVM's invocation of the <clinit> method could possibly be triggered.

Potential deadlock conditions are possible in the absence of the application of the foregoing techniques in all environments in which a global application locking mechanism is used to ensure that no more than one thread executes at any given time. In one embodiment of the invention, the global application locking mechanism is used during both record and replay times. Therefore, in one embodiment of the invention, the foregoing techniques are performed during both record and replay times in order to prevent potential deadlock conditions.

Figure 4:
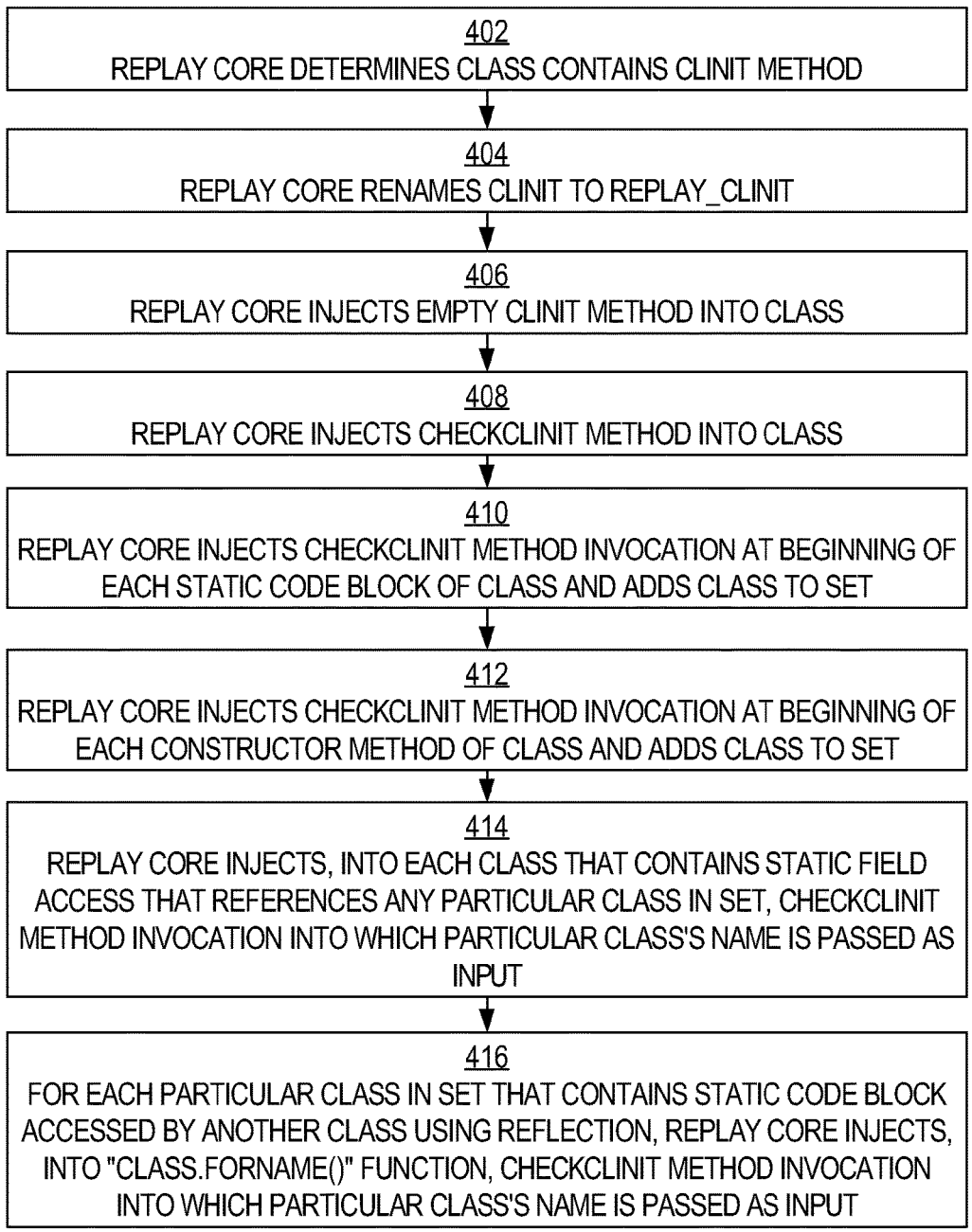
FIG. 4 is a flow diagram that illustrates an example of a technique for preventing deadlock conditions that might otherwise arise during class initialization due to the imposition of a global application locking mechanism that enforces single thread execution, according to an embodiment of the invention.

FIG. 4 is a flow diagram that illustrates an example of a technique for preventing deadlock conditions that might otherwise arise during class initialization due to the imposition of a global application locking mechanism that enforces single thread execution, according to an embodiment of the invention. In block 402, the replay core determines that a class contains a <clinit> method. In block 404, in response to the determination that the class contains a <clinit> method, the replay core renames the <clinit> method to replay_clinit. In block 406, the replay core injects an empty <clinit> method into the class. In block 408, the replay core injects, into the class, a replay_check_clinit method which, when executed, determines whether replay_clinit has already been executed relative to the class, and executes replay_clinit relative to the class only if replay_clinit has not yet been executed relative to the class.

In block 410, the replay core injects a replay_check_clinit method invocation at the beginning of each static code block of the class, and adds the class to a set of injected classes. In block 412, the replay core injects a replay_check_clinit method invocation at the beginning of each of the class's constructors (<init> methods), and adds the class to the set of injected classes. In block 414, for each particular class in the set of injected classes, the replay core injects, into each other class that contains a static field access that references that particular class, a replay_check_clinit method invocation into which is passed, as input, the name of the class of which the static field is a member. The replay core injects this replay_check_clinit method invocation prior to the static field access within the particular class. In block 416, for each particular class in the set of injected classes containing a static code block that is accessed by another class using reflection, the replay core injects, into the body of the "Class.forName( )" function, a replay_check_clinit method

Just-in-Time Compilation

Just-in-time (JIT) compilation, also known as dynamic translation, is a technique for improving the runtime performance of a computer program. JIT compilation converts code at runtime prior to executing the converted code natively. For example, JIT compilation may convert bytecode into native machine code at runtime. Translated blocks of code are cached and reused, thereby removing the need for the JVM to re-evaluate each bytecode within an untranslated version of such a block every time that bytecode is encountered.

Under some circumstances, JIT compilation can cause classes, which would not be loaded at runtime but for JIT compilation, to be loaded at runtime. The following pseudo code may be considered for purposes of an illustrative example:

```
class F {
    void Foo(A a, B b) {
        if (a != NULL) {
            C c = (c) a} } }
```

Under normal circumstances, the JVM will follow a lazy loading approach at runtime. Under the lazy loading approach, the JVM will not load a class at runtime until the application program instantiates an instance of that class. In the foregoing pseudo code, if only NULL values are ever passed as the values of parameters a and b, then the lazy loading approach will not ever cause class A or class B to be loaded at runtime (assuming that no other code elsewhere in the application program causes class A or class B to be loaded).

Nevertheless, there remains the possibility that method Foo will be JIT compiled. There is no effective way of predicting whether a particular block of code will be JIT compiled at runtime. JIT compilation of method Foo will cause classes A and B to be loaded at runtime. JIT compilation is inherently non-deterministic because JIT compilation can occur at any time while an application program is executing. Because JIT compilation can causes classes to be loaded, class loading that is performed in response to JIT compilation also is performed in a non-deterministic manner. However, unless classes are loaded during replay time in the same order in which those classes were loaded during record time, the execution of the application program during replay time might not be consistent with the execution of the application program during record time. The possibility of inconsistent execution arises at least partially from the fact that custom class loaders are capable of changing application program state.

Therefore, techniques described herein ensure that classes will not be loaded non-deterministically as a consequence of JIT compilation. In one embodiment of the invention, whenever a class is being prepared during the linking process, the JVM generates a "class prepare" event. The replay core listens for and intercepts these "class prepare" events. In response to intercepting a "class prepare" event, the replay core invokes methods exposed by TI in order to obtain all of the method signatures of the methods of the class that is being prepared. For each method signature obtained in this manner, and in the order in which the methods occur in the class, the replay core examines that method signature and identifies each class within that signature. The replay core then deterministically loads each such class, in the order in which those classes are identified in the method signature. Thus, any class that could theoretically be loaded due to JIT compilation will be loaded, in a known, deterministic order, even if the code whose JIT compilation would have caused that class to be loaded does not actually end up being JIT compiled at runtime. The classes are loaded during the preparation process during both record time and replay time, and in the same order.

The classes are loaded deterministically during the preparation process, before the JIT compiler has an opportunity to cause those classes to be loaded non-deterministically at runtime. At runtime, if a class has already been loaded, then the JIT compiler will not attempt to re-load that class.

The JIT compiler also will cause classes to be loaded at runtime whenever the code being JIT compiled contains a type-casting operation. The JIT compiler will cause all of the classes involved in such a type-casting operation to be loaded (again, non-deterministically) if those classes have not already been loaded. In the preceding pseudo code, the instruction "C c=(c) a" is an example of such a type-casting operation. JIT compilation of method Foo will cause class C to be loaded because class C is involved in the type-casting operation.

When source code is converted into bytecode, type-casting operations specified in the source code will cause a "checkcast" bytecode to be produced. Any "instanceof" operations specified in the source code will cause an "instanceof" bytecode to be produced. According to one embodiment of the invention, at both record time and replay time, the replay core inspects the application program's bytecode prior to application program execution. For each "checkcast" or "instanceof" bytecode that the replay core encounters in the bytecode, the replay core injects, immediately before that bytecode, an "LDC" bytecode that identifies a class that is specified by the "checkcast" or "instanceof" instruction. The "LDC" bytecode forces the JVM to load the identified class when the JVM encounters the "LDC" bytecode at runtime.

Figure 5:
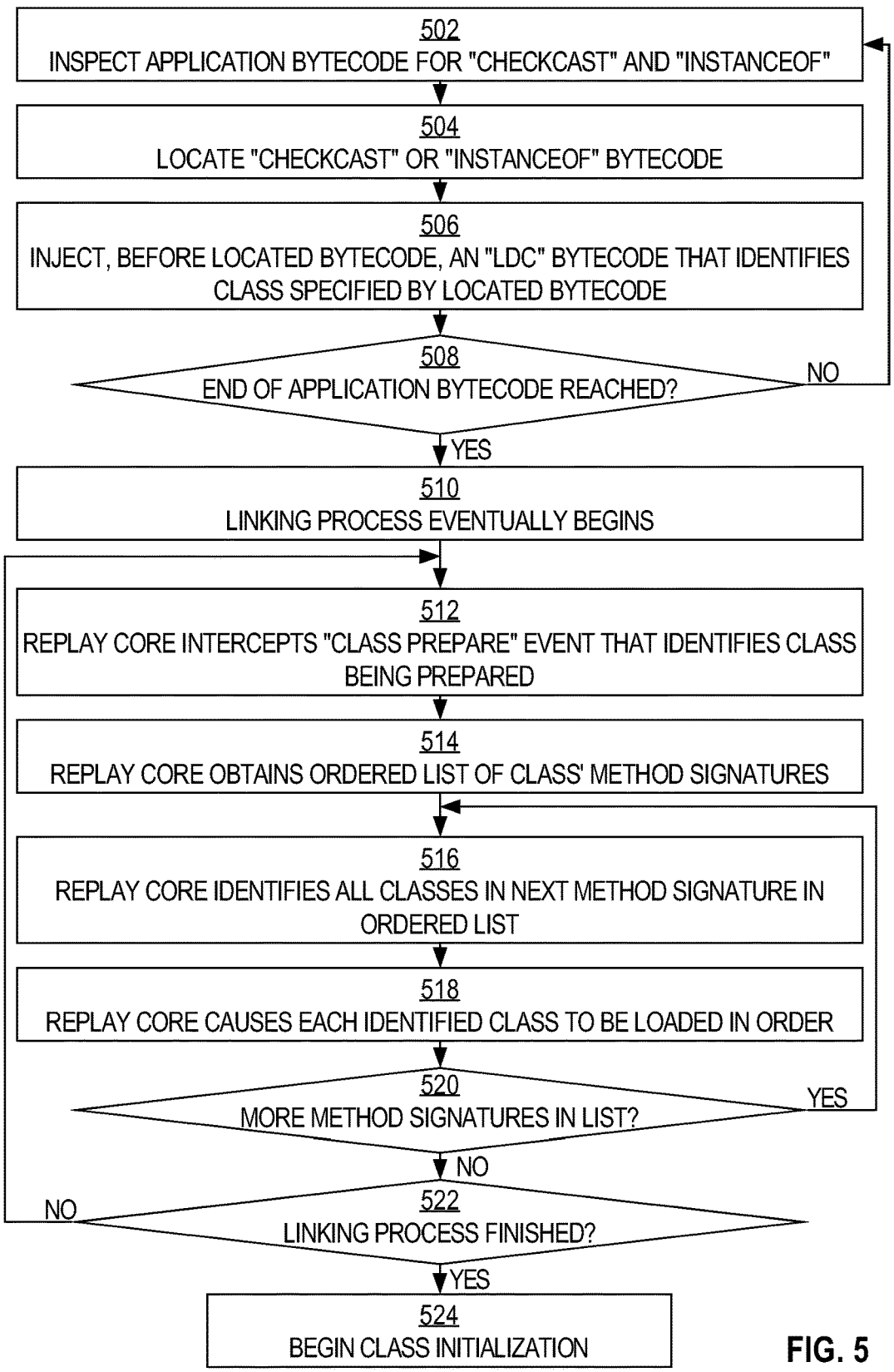
FIG. 5 is a flow diagram that illustrates an example of a technique for preemptively loading, in a deterministic manner, classes whose non-deterministic loading otherwise might be caused by the JIT compiler at runtime, according to an embodiment of the invention.

FIG. 5 is a flow diagram that illustrates an example of a technique for preemptively loading, in a deterministic manner, classes whose non-deterministic loading otherwise might be caused by the JIT compiler at runtime, according to an embodiment of the invention. In one embodiment of the invention, the technique is performed at both record time and at replay time.

In block 502, application program bytecode is inspected for occurrences of "checkcast" and "instanceof" bytecodes. In block 504, a "checkcast" or "instanceof" bytecode is located. In block 506, an "LDC" bytecode, which identifies the class that is specified by the "checkcast" or "instanceof" bytecode, is injected before the "checkcast" or "instanceof" bytecode. In block 508, a determination is made at to whether the end of the application bytecode has been reached. If the end of the application bytecode has been reached, then control passes to block 510. Otherwise, control passes back to block 502.

In block 510, after potentially numerous other operations being performed (e.g., during the class loading process), the linking process begins. In block 512, the replay core intercepts a "class prepare" event that identifies a class that is being prepared. In block 514, in response to intercepting the "class prepare" event, the replay core invokes methods exposed by TI to obtain an ordered list all of the method signatures of the event-identified class.

In block 516, the replay core determines all of the classes that are identified within the next method signature in the ordered list. In block 518, the replay core causes each class identified within the method signature to be loaded (e.g., by invoking that class's class loader) in the order in which that class is identified by the method signature. In block 520, the replay core determines whether any further method signatures are contained in the ordered list. If another method signature is contained in the ordered list, then control passes back to block 516. Otherwise, control passes to block 522.

In block 522, the replay core determines whether the linking process has finished. If the linking process has not finished, then the replay core continues to listen for "class prepare" events, and control passes back to block 512. Otherwise, control passes to block 524.

In block 524, the class initialization process begins. At this point, all of the classes whose loading possibly could be caused by the JIT compiler at runtime have already been loaded through the foregoing technique.

Handling Native Function Calls

As is discussed above in connection with FIG. 1, virtual machine environment 100 includes application program 102, virtual machine 104 (in one embodiment, the JVM), and operating system 106. In addition to custom code authored by a programmer, application program 102 may include development kits, such as the JAVA Development Kit ("JDK"), that are authored by others than the author of the custom code. The programmer's custom code may invoke instructions within the development kits. The programmer's custom code and the development kits may invoke instructions within virtual machine 104. Program code within application program 102, including any program code within development kits, is non-native code, while code within virtual machine 104 and operating system 106 is native code. When an instruction within application 102 invokes code within JVM 104, this invocation is called a "native call." Often, the code invoked by a native call will not be in the same programming language as the instruction that made the native call. For example, although a JAVA bytecode might make a native call, the code invoked by the native call might not be JAVA bytecode.

Additionally, application program 102 may supply its own set of libraries (e.g., DLLs) which are "native" in that the instructions within these libraries are not interpreted or executed by virtual machine 104. Application program 102 may make native calls to functions that are specified within these libraries.

Non-determinism in the execution of a program is usually introduced by operating system 106 and/or the hardware environment on which operating system 106 executes. Disk I/O accesses and network communications may be sources of non-determinism in a program's execution, for example. Operating system 106 is not necessarily the only source of non-determinism, however; a garbage collection subsystem of virtual machine 104 also may introduce non-determinism. Because native calls potentially cause operations to be performed by operating system 106, native calls are potential sources of non-determinism in a program's execution.

In addition to native calls made by application program 102 into virtual machine 104, a program's execution may involve virtual machine 104 making "callbacks" into application program 102 (such as to a development kit like JDK). Some of these callbacks are capable of changing the state of the executing program.

According to one embodiment of the invention, in order to ensure that an application program's execution is faithfully and consistently reproduced during replay time, the replay core records, during record time, (a) return values and (b) output parameter values of native function calls. Each function call may indicate (a) a return variable that is to receive the result returned by the function call, (b) a method or function name, and (c) a list of parameters. The list of parameters may include input parameters and/or output parameters. Input parameters indicate values that are specified by the function call and used by the function. Output parameters indicate objects and/or memory pointers that are specified by the function call. The function may change these objects and/or the data stored at the memory locations pointed to by these memory pointers, even if the function does not expressly return the values of those objects or data.

Under circumstances in which virtual machine 104 is the JVM, whenever a native function (in either virtual machine 104 or in some library) calls back into application program 102, the native function does so through the JAVA Native Interface ("JNI"). There is a finite set of functions within the JNI, and each such function's identity is known. A list of the JNI functions is contained within the "JAVA Native Interface Specification" published on the Internet by Sun Microsystems, Inc. "The Java™ Native Interface: Programmer's Guide and Specification" by Sheng Liang (ISBN 0-201-32577-2) is incorporated by reference herein.

The assumption is made that return values of native function calls will be non-deterministic, because there is currently no effective way for the replay core to determine whether a particular native function's operations will always be deterministic in nature. Therefore, in one embodiment of the invention, during record time, the replay core detects each occurrence of a native function call. In response to detecting a native function call, the replay core records (e.g., by emitting into the replay stream) the value returned (if any) by the called native function when the native function returns. At replay time, the replay core again detects whenever a native function call is going to be made. Instead of permitting the call to be made, the replay core instead reads the previously recorded return value and provides that value to the instruction that would have made the call.

This still leaves the matter of how output parameters should be handled. Whether a parameter is an input parameter (whose value the native function cannot change) or an output parameter (whose value the native function might change) is not necessarily determinable. However, parameters that are primitive types (e.g., integers, doubles, floats, etc.) are known to be input parameters. Parameters that are not primitive types (e.g., parameters that are non-primitive objects) might be input parameters or output parameters. In one embodiment of the invention, the assumption is made that all parameters that are not primitive types are potentially output parameters. These output parameters may be objects that a native function might modify, and whose modification the replay core should monitor in order to provide a faithful and consistent replay of the program's execution during replay time. Fortunately, in a JVM environment, any modifications that a native function makes to an object are made through the JNI, making the detection of such modifications possible.

For example, application program 102 might make a call to a native function called "fillBuffer." The fillBuffer function might be implemented in native code in a DLL rather than in JAVA bytecode. The fillBuffer function might return an integer that indicates a quantity of data that was written to a buffer. The fillBuffer function might accept two parameters: "size," of type integer, and "buffer" of type object. Generally, the fillBuffer function, when called, may write data to the object that is passed to the function as the "buffer" parameter. More specifically, the fillBuffer function might make multiple calls to the JNI "writeArray" function, passing "buffer" as a parameter to that function. Each time that the JNI writeArray function is called, the JNI writeArray function may insert additional data into the "buffer" object. The fillBuffer function also might make a call to the JNI "callMethod" function, passing, as a parameter to the JNI callMethod.function, the name of a non-native function "getMoreData" function that is implemented by application 102 (and not within the DLL). Finally, the fillBuffer function might return an integer value that indicates the quantity of data that was written to the "buffer" object. Significantly, each of these operations, internal to the fillBuffer function, is non-deterministic.

In one embodiment of the invention, in order to intercept native function calls and track the operations that are performed by the called native functions, a separate native "thunk" is generated for each and every native function call that is intercepted. A separate "functionInfo" object is generated and populated for each and every such native functional call also. Additionally, a single native proxy function—not specific to any particular native functional call—is generated.

According to one embodiment of the invention, when the JVM first starts up, the JVM generates JNI native bind events through TI. The JVM generates a JNI native bind event each time that the bytecode of application program 102 is about to call a particular native function for the first time during the execution of that program (JNI bind events are not generated for subsequent calls of a native function that has already been called). The replay core listens for and responds to these JNI native bind events by dynamically generating native thunks which are, themselves, functions. The replay core instructs the JVM to call these native thunks instead of the native functions that would have been called. For example, in response to a JNI native bind event that indicates that the native function fillBuffer is about to be called by application program 102, the replay core may dynamically generate a native thunk for the fillBuffer function, and instruct the JVM to call that native thunk instead of the actual fillBuffer function. Essentially, the replay core instructs the JVM to substitute a binding to the native thunk in place of the binding that would be been made to the actual native function (e.g., fillBuffer) called by the bytecode of application program 102. The replay core instructs the JVM to execute the code at a specified memory address—the memory address at which the native thunk is located—instead of the actual native function's code. However, the replay core also determines and stores the memory address at which the actual native function is located.

The functionInfo object that the replay core generates in response to a JNI native bind event contains several items of information, including (a) a name of a native function (e.g., "fillBuffer"), (b) a list of types of the native function's arguments, and (c) the memory address at which the native function is located. In one embodiment of the invention, the replay core generates and populates a functionInfo object for a native function in conjunction with the replay core's generation of the native thunk for that native function, discussed above. In one embodiment of the invention, the replay core populates the functionInfo object with information that is specified in the JNI native bind event that the replay core intercepted.

The native thunk dynamically generated for a particular native function performs several operations. First, the native thunk pushes, onto the stack, a memory pointer to the first argument of the particular native function's argument list. The native function's arguments are stored contiguously in memory. Next, the native thunk pushes, onto the stack, the functionInfo object that has been dynamically generated for the particular native function, as discussed above. Then, the native thunk calls the native proxy function, which is not specific to any native function. Due to the substitution performed in response to the JNI native bind event, discussed above, when application program 102 attempts to call the native function, the JVM calls the native thunk instead. As will be discussed below, the native proxy function may return a value, which the native thunk then returns to application program 102 at the point at which the original native function otherwise would have provided that return value (had the original native function been called instead of the native thunk).

The native proxy function, called by the native thunk after the native thunk pushes the data discussed above onto the stack, expects to be passed two parameters as input. One of the parameters is the functionInfo object discussed above, and the other parameter is a pointer to a first argument in a list of arguments. In one embodiment of the invention, the native proxy function determines whether the native proxy function is being called at record time or at replay time. In response to determining that it is being called at record time, the native proxy function calls the actual native function that is indicated in the functionInfo object. The native proxy function accomplishes this by calling the original native function that is located at the memory address indicated in the functionInfo object. When the original native function returns, the native proxy function records (e.g., by emitting into the replay stream) the value, if any, that was returned by the original native function. Additionally, the native proxy function provides the return value to the native thunk that called the native proxy function.

Operations that the native proxy function performs in response to determining that the native proxy function is being called during replay time will be described after the following discussion of JNI callback handing.

A native function, when executed during record time (e.g., by the native proxy function), might perform potentially non-deterministic JNI callbacks. TI provides a mechanism of overriding JNI callbacks that might be made during the execution of a native function. In one embodiment of the invention, the replay core, through TI, overrides all of the JNI callbacks that are potentially non-deterministic. Essentially, the replay core instructs the JVM to call alternative specified functions in place of any calls made through the JNI. In one embodiment of the invention, the replay core generates a separate JNI callback thunk for each method specified by JNI. Using the TI override process, the replay core instructs the JVM to call the JNI callback thunk generated for a particular JNI method instead of calling that particular JNI method whenever that particular JNI method would be called during the execution of application program 102.

The JNI callback thunk generated for a particular JNI method performs several operations. First, the JNI callback thunk pushes, onto the stack, a memory pointer to the first argument of the particular JNI method's argument list. The JNI method's arguments are stored contiguously in memory. Next, the JNI callback thunk pushes, onto the stack, a JNIInfo object that has been generated for the particular JNI method. In one embodiment of the invention, the JNIInfo object contains similar kinds of information as the functionInfo object discussed above, except that the information in the JNIInfo object pertains to a JNI method and its arguments rather than a native function and its arguments. After pushing the above data onto the stack, the JNI callback thunk calls a JNI proxy function, which is not specific to any JNI method.

The JNI proxy function expects to be passed two parameters as input. One of the parameters is a JNIInfo object, and the other parameter is a pointer to a first argument in a list of arguments. In one embodiment of the invention, the JNI proxy function determines whether the JNI proxy function is being called at record time or at replay time. In response to determining that it is being called at record time, the JNI proxy function performs the following operations. The JNI proxy function records (e.g., by emitting into the replay stream) the name of the JNI method that is specified in the passed-in JNIInfo object. The JNI proxy function also records (e.g., by emitting into the replay stream) the values of all of the arguments of the JNI method, as specified by the passed-in JNIInfo object. The JNI proxy function calls the JNI method that is specified in the passed-in JNIInfo object by calling the JNI method that is located at the memory address specified by the JNIInfo object. Prior to calling the JNI method, the JNI proxy function pushes, onto the stack, the arguments that the JNI method is expecting.

In one embodiment of the invention, some JNI methods are specially handled. In one embodiment of the invention, if the JNI method specified in the JNIInfo object is "writeArray," then the replay core additionally records both the data contained in the "buffer" argument and the value of the "size" argument. Any raw data needed to replicate the JNI method call is recorded. In one embodiment of the invention, if the JNI method specified in the JNIInfo object is "callMethod," then the replay core additionally records the identity of the method specified as an argument to "callMethod" as well as any arguments of that method.

Operations that the JNI proxy function performs in response to determining that the JNI proxy function is being called during replay time will be described after the following discussion of the operations that the native proxy function performs in response to determining that the native proxy function is being called during replay time.

In response to determining that it is being called during replay time, the native proxy function performs the following operations. Significantly, in one embodiment of the invention, the native proxy function does not ever call the original native function during replay time; in such an embodiment of the invention, native functions are not called during replay time. Instead, the native proxy function determines (e.g., from the replay stream) whether the original native function made any JNI callbacks at record time. If so, then the native proxy function calls the JNI proxy function. After the JNI proxy function returns, the native proxy function reads the return value (if any) that the native proxy function emitted into the replay stream during record time, and provides that return value to the native thunk that called the native proxy function. As is discussed above, the native thunk then returns that value to application program 102 at the point at which the original native function otherwise would have provided that return value (had the original native function been called instead of the native thunk).

In response to determining that it is being called at replay time, the JNI proxy function replays JNI callbacks. In one embodiment of the invention, although native functions themselves are not replayed during replay time, any JNI callbacks indicated in the replay stream, which were called by native functions at record time, are replayed with the same parameters and data that are specified within the replay stream. Thus, if native function "fillBuffer" was called during record time, then "fillBuffer" will not be called during replay time. However, if "fillBuffer" called the JNI methods "writeArray" and "callMethod" at record time, then, during replay time, the replay core will again call "writeArray" and "callMethod" in the same order and passing the same parameters that were passed to these JNI methods at record time. In one embodiment of the invention, the manner in which the JNI proxy function parses the data in the replay stream depends on the identity of the JNI method that is going to be called.

In one embodiment of the invention, any objects returned by any JNI methods are assigned a unique identifier and stored in association with that identifier in a local map. In such an embodiment of the invention, whenever a JNI method subsequently refers to that object, the replay core locates the object in the local map, retrieves the object's data, and provides the object's data to that JNI method. The same map is deterministically generated by the replay core during both record and replay times.

Figure 6:
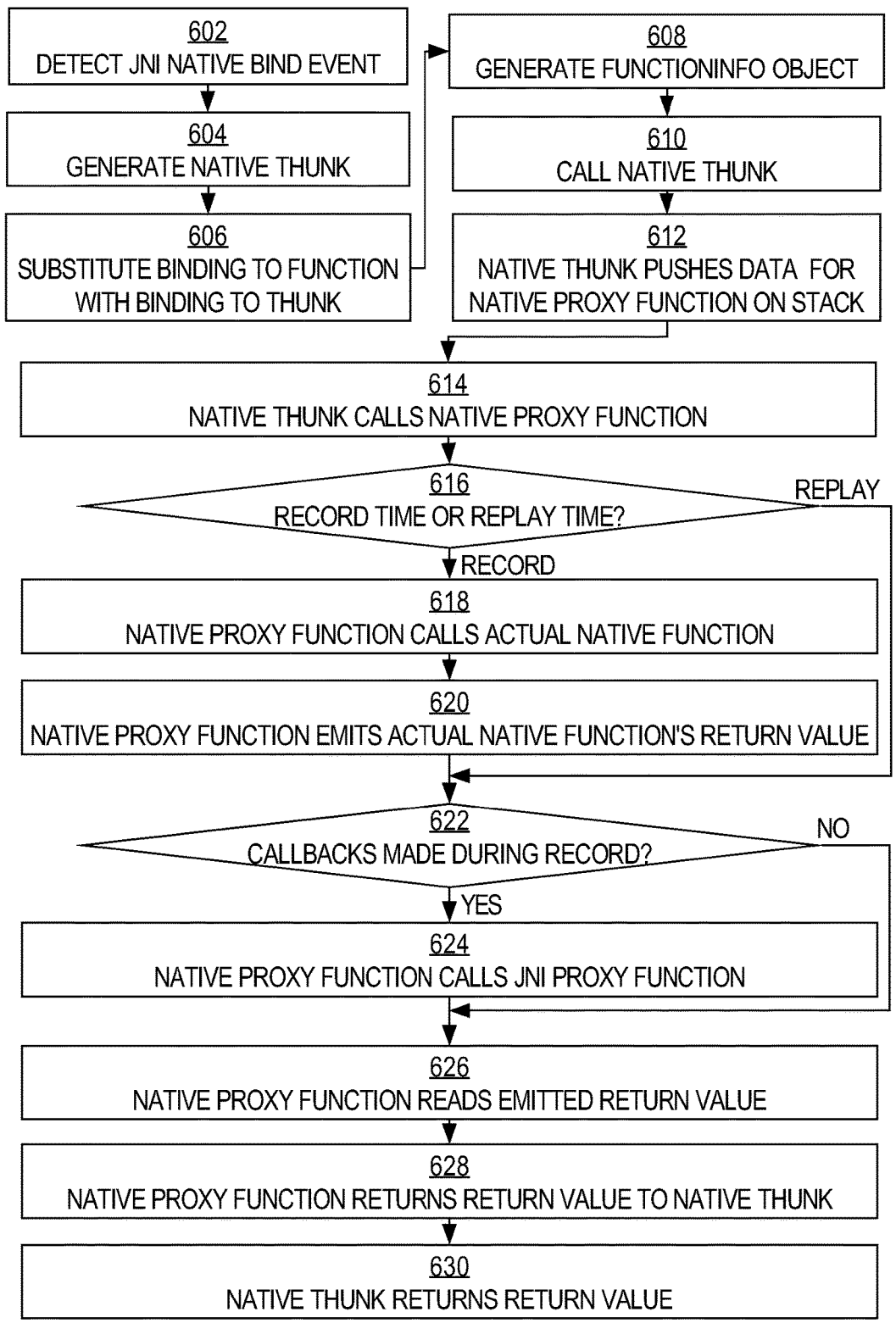
FIG. 6 is a flow diagram that illustrates an example of a technique for handling native function calls made by an application program, according to an embodiment of the invention.

FIG. 6 is a flow diagram that illustrates an example of a technique for handling native function calls made by an application program, according to an embodiment of the invention. In block 602, the replay core detects a JNI native bind event. In block 604, the replay core generates a native thunk that corresponds to a native function identified by the event. In one embodiment of the invention, the operations of block 604 are only performed if no previous JNI native bind event has identified the native function during the application program's execution. In block 606, the replay core instructs the JVM to substitute a binding to the native thunk in place of a binding to the native function. In block 608, the replay core generates a functionInfo object that identifies information about the native function. In block 610, the JVM calls the native thunk instead of the native function.

In block 612, the native thunk pushes data expected by a native proxy function onto the stack. The data includes the functionInfo object. In block 614, the native thunk calls the native proxy function.

In block 616, the native proxy function determines whether it is being called during record time or replay time. If the native proxy function is being called during record time, then control passes to block 618. Alternatively, if the native proxy function is being called during replay time, then control passes to block 622.

In block 618, the native proxy function calls the original native function that is identified in the functionInfo object. It is possible that the original native function may perform JNI callbacks. The handling of such JNI callbacks is discussed below with reference to FIG. 7. Regardless of the operations that the original native function performs, after the original native function has completed its execution, in block 620, the native proxy function emits, into the replay stream, a return value (if any) returned by the original native function. Control then passes to block 628.

Alternatively, in block 622, the native proxy function determines whether the original native function made any JNI callbacks during record time. If the original native function made at least one JNI callback during record time, then control passes to block 624. Otherwise, control passes to block 626.

In block 624, the native proxy function calls the JNI proxy function. The behavior of the JNI proxy function is described below with reference to FIG. 7. When the JNI proxy function returns, control passes to block 626.

In block 626, the native proxy function reads, from the replay stream, the return value (if any) that the native proxy function emitted into the replay stream during record time. Control passes to block 628.

In block 628, the native proxy function returns the return value (if any) to the native thunk. In block 630, the native thunk returns the return value (if any) to the application program at the point at which the original native function otherwise would have provided that return value to the application program.

Figure 7:
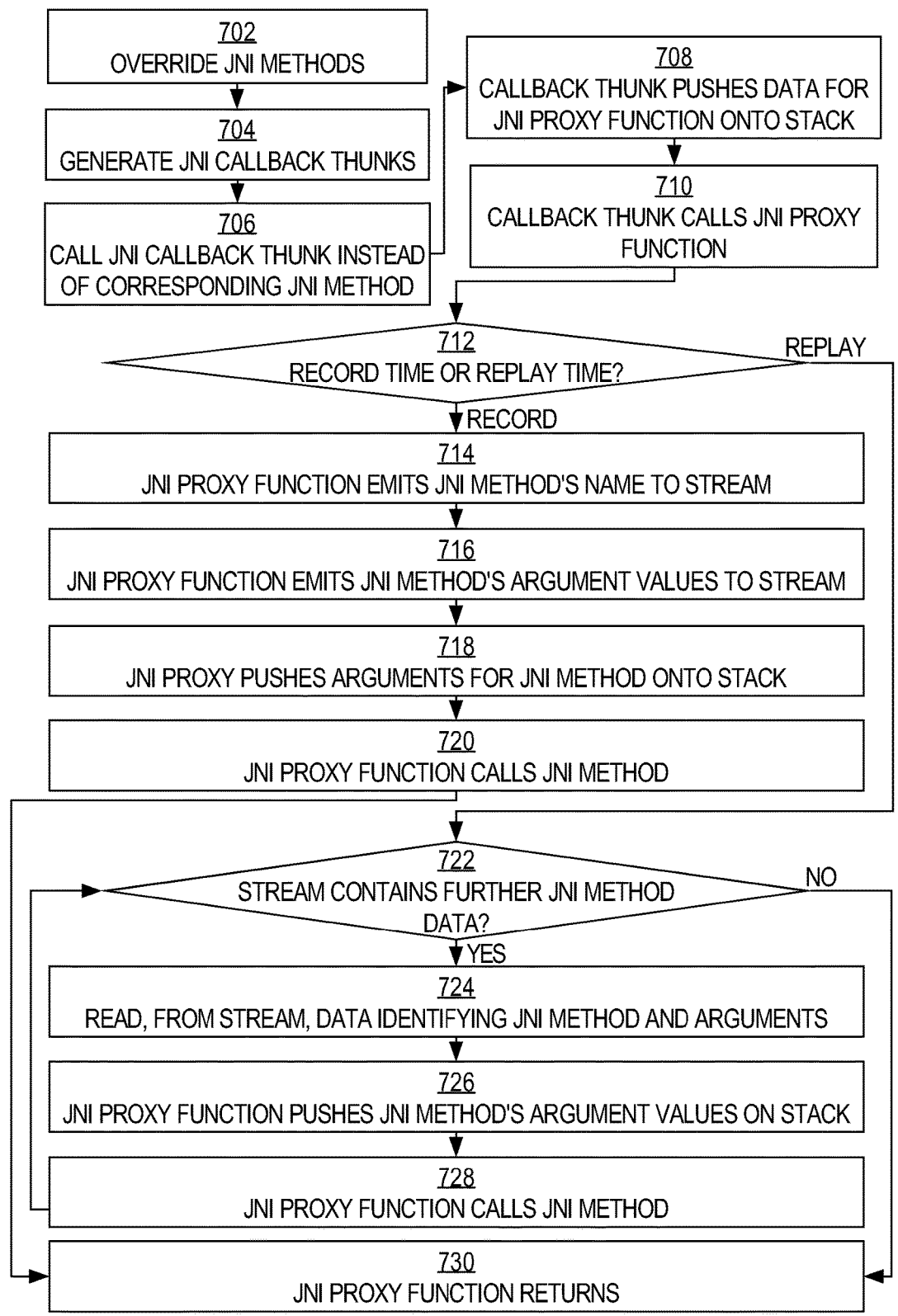
FIG. 7 is a flow diagram that illustrates an example of a technique for handling JNI callbacks made by a native function, according to an embodiment of the invention.

FIG. 7 is a flow diagram that illustrates an example of a technique for handling JNI callbacks made by a native function, according to an embodiment of the invention. In block 702, the replay core uses TI to override a specified set of JNI methods by instructing the JVM to call alternative specified functions (JNI callback thunks) instead of the JNI methods wherever those JNI methods would be called. In block 704, for each JNI method overridden, the replay core generates a separate corresponding JNI callback thunk that the JVM has been instructed to call instead of that JNI method. In block 706, the JVM calls a particular JNI callback thunk corresponding to a particular JNI method instead of calling the particular JNI method. In some cases, the attempt to call the particular JNI method will have been made by a native function during record time.

In block 708, the particular JNI callback thunk pushes data expected by a JNI proxy function onto the stack. The data includes the JNIInfo object. In block 710, the JNI callback thunk calls the JNI proxy function.

In block 712, the JNI proxy function determines whether it is being called during record time or replay time. If the JNI proxy function is being called during record time, then control passes to block 714. Alternatively, if the JNI proxy function is being called during replay time, then control passes to block 722.

In block 714, the JNI proxy function emits, into the replay stream, the name of the JNI method that is specified in the JNIInfo object (the particular JNI method to which the particular JNI callback thunk corresponds). In block 716, the JNI proxy function emits, into the replay stream, values of all of the arguments of the particular JNI method, as specified by the JNIInfo object. In block 718, the JNI proxy function pushes, onto the stack, the arguments that the particular JNI method is expecting. In block 720, the JNI proxy function calls the particular JNI method. Control then passes to block 730.

Alternatively, in block 722, the JNI proxy function determines whether the replay stream contains further data that identifies a JNI method and the values of the parameters of that JNI method. If the replay stream contains such further data, then control passes to block 724. Otherwise, control passes to block 730.

In block 724, the JNI proxy function reads, from the replay stream, data that identifies a JNI method and the values of the parameters of that JNI method. In block 726, the JNI proxy function pushes the JNI method's parameter values onto the stack. In block 728, the JNI proxy function calls the JNI method. When the JNI method returns, control passes back to block 722.

Alternatively, in block 730, the JNI proxy function returns. If the JNI proxy function was called by the particular JNI callback thunk, then the JNI callback thunk subsequently returns; under such circumstances, the application program continues to execute at the point at which the particular JNI callback thunk was called.

Finalizer

In the JAVA programming language, every class derives from the java.lang.object class ("the Object class"). The Object class defines a method called "finalize." By default, the finalize method does nothing. However, other classes that inherit from or "extend" the Object class are permitted to override the finalize method by defining their own custom implementation of that method. When an instance of a class is about to be deleted during runtime, the JVM calls the finalize method of that instance's class.

According to one embodiment of the invention, the replay core ensures that references to objects are removed at the same relative times and in the same relative order within a program's execution during both record time and replay time. However, even if a reference to an object is guaranteed to be removed at a certain time during a program's execution, this does not by itself guarantee that a JVM thread executing in the background in native space will dispatch calls to the finalize method of that object at consistent times or in a consistent order during both record time and replay time.

At non-deterministic times during a program's execution, garbage collection is performed in the background of the execution environment. During garbage collection, a garbage collector thread deletes all objects to which there are no longer any references. When the garbage collector thread deletes an object, the garbage collector thread invokes the finalize method of that object. The garbage collector thread's activities do not involve the JNI, so events that the JNI generates cannot be used to detect when an object's finalize method is going to be invoked. The garbage collector thread cannot be controlled by the replay core. Yet, because an object's finalize method may perform operations that affect program state, the replay of a program's execution cannot be guaranteed to be consistent with the original execution of that program unless the finalize method of that object is called at the same relative times during both record time and replay time.

Whenever an object whose class defines a custom finalize method is created, the JVM detects this event and invokes a "register" method of the javalang.ref.finalizer class ("the Finalizer class"). The register method expects an object as an input parameter. Whenever a new object is created (e.g., using the "new" operation), the JVM invokes the Finalizer class's register method and passes that new object as an input parameter to the register method.

In one embodiment of the invention, at class loading time, the replay core injects code into the Finalizer class's register method. As a result of the modification of the register method, the register method first determines whether the register method is being called during record time or during replay time. In response to determining that it is being called during record time, the register method registers the finalize method of the new object's class with the Finalizer class. Alternatively, in response to determining that it is being called during replay time, the register method adds a hard (i.e., strong) reference to the new object and then exits without registering the finalize method of the new object's class with the Finalizer class. Consequently, during replay time, the JVM is prevented from calling the finalize methods of any class, leaving the responsibility for calling those finalize methods with the replay core.

The replay core injects, at the beginning of the register method (before other operations specified in the register method can be performed), code which causes the register method to pass the new object to the replay core. Consequently, during program execution, when an object's finalizer method is invoked by the garbage collector thread, the replay core receives that object from the register method before any other operations of that object's finalizer method are performed.

In one embodiment of the invention, in response to receiving an object in this manner, the replay core assigns a unique identifier (or "tag") to the object using TI. Because the addition of a reference to the object would prevent the object from subsequently being finalized (thereby potentially affecting program execution), the replay core does not add any reference to the object. The replay core stores the mapping between the object and the object's assigned identifier. The replay core then returns control to the register method, which proceeds as usual.

Additionally, in one embodiment of the invention, at class loading time, the replay core injects code into the finalize method of each class other than the Object class. The injected code invokes a "replayFinalize" method defined by the replay core, passing an instance of the class (e.g., using the "this" keyword) as input to the replayFinalize method. When invoked, the replayFinalize method records the object's previously stored unique identifier (which the replay core can query using TI), thereby creating data that indicates that the object having that identifier is going to be deleted; the fact that the replayFinalize method has been invoked indicates that the object's finalize method has been invoked by the garbage collector thread. Additionally, the replayFinalize method adds a hard reference to the object, which, by that time, is already being garbage-collected. The addition of the hard reference to the object temporarily prevents the object from being completely deleted by the garbage collector thread. The replayFinalize method places the object's identifier and the hard reference into a map, associating the identifier and the reference with the object.

In one embodiment of the invention, when the replayFinalize method returns, the code injected into the finalize method of the object's class prevents the remainder of the finalize method from executing. In one embodiment of the invention, the code previously injected into each class's finalize method contains logic which detects whether the finalize method is being invoked from a finalize dispatcher thread (discussed below), and, in response to determining that the finalize method is not being invoked from the finalize dispatcher thread, prevents the remainder of the code in the finalize method from being executed. As a result, from the perspective of application program 102, the object's finalize method has not yet been called and remains undispatched.

At some later point in the execution of application program 102, a deterministic point is reached. For example, such a deterministic point may be reached when the native proxy function, discussed above, is called; the native proxy function, in one embodiment of the invention, is called whenever a native function would have been called by application program 102, and the calling of the native proxy function is anticipated to be a fairly frequent occurrence during the execution of any application program. In one embodiment of the invention, at each such deterministic point, the code of the replay core determines whether any outstanding finalize calls still need to be dispatched. In one embodiment of the invention, at each of these deterministic points, the replay core invokes a "finalizeFlush" method of the replay core. The invocation of the finalizeFlush method may be placed at the beginning of the native proxy function, for example.

In one embodiment of the invention, the finalizeFlush method executes within a "finalize dispatcher" thread. The behavior of the finalizeFlush method varies depending on whether the finalizeFlush method is being invoked during record time or replay time. The behavior of the finalizeFlush method during record time is described first. During record time, the finalizeFlush method examines the map to which the object's identifier and hard reference were previously added by the replayFinalize method. For each object identified in the map, the finalizeFlush method invokes the finalize method of that object using the JNI. The object's finalize method is accessible through the object's identifier, indicated in the map. In one embodiment of the invention, the code previously injected into each class's finalize method contains logic which detects whether the finalize method is being invoked from the finalize dispatcher thread, and, in response to determining that the finalize method is being invoked from the finalize dispatcher thread, allows the remainder of the code in the finalize method to be executed.

After the invocation of the finalize methods of the objects in the map, the finalizeFlush method removes the hard references that the replayFinalize method previously added to those objects. The removal of the hard references to those objects permits the garbage collector thread to complete the deletion of those objects. The JVM guarantees that each object's finalize method is only called once, so the garbage collector thread will not re-call those objects' finalize methods. The finalizeFlush method also removes, from the map, the identifiers of the objects whose finalize methods the finalizeFlush method has invoked.

Alternatively, during replay time, the finalizeFlush method, called at the same deterministic point as on record, replays the tags (the identifiers) of the objects that were previously finalized during the corresponding record time. The finalizeFlush method locates the references to these objects in the map. The finalizeFlush method invokes the finalize method of each such object. The finalizeFlush method removes the hard reference that was added by the replay core's RegisterFinalize method, which is called from java.lang.Finalizer.register method. The strong reference is added when the register method is invoked on replay. The strong reference prevents the garbage collection of that object. As a result, the garbage collector thread is permitted to complete the deletion of those objects. The finalizeFlush method also removes the identifier of each such object from the map. On replay, the injected code prevents the registration of the finalize object, thus the invocation to the object's finalize method will only be called by the finalizeFlush method, at the same deterministic time as on record.

Weak References

In some programming environments, including those in which JAVA programs are executed, four different types of references exist: strong (or "hard") references, weak references, soft references, and phantom references. Typically, unless expressly declared to be of some other type, a reference is created as a strong reference. An object that is currently referenced by a strong reference cannot be garbage-collected. In contrast, an object that is currently referenced by a weak reference still can be garbage-collected if the reference is not also currently referenced by a strong reference; a weak reference, by itself, will not prevent the garbage collector from deleting an object to which the weak reference refers. An object that is currently referenced by a soft reference will not be garbage-collected unless the available system memory falls below some specified threshold. Phantom references are similar to weak references and are used to detect garbage collection events, but are rarely used.

In the context of references, two concepts are significant. One of these concepts is the reference object. The other of these concepts is the referent. The reference object points to the referent, which may be thought of as "the object" itself. The reference object has a "get" method which, when invoked, either returns a strong reference to the referent, or returns "NULL" if the referent has been garbage-collected. Because the invocation of the reference object's "get" method creates a strong reference to the referent, the referent will not be garbage-collected after the invocation of the "get" method even if the original reference to the referent was a weak reference that would not have prevented the referent from being garbage-collected.

Each reference object may additionally (but optionally) refer to a reference queue object. When the garbage collector garbage-collects a referent, the garbage collector sets the referent to "NULL" and places the reference object that refers to the referent on the reference queue to which the reference object refers. In order to ensure that a program's execution is consistent between record time and replay time, techniques described herein make these otherwise non-deterministic operations deterministic. In one embodiment of the invention, for each reference object that does not yet refer to a reference queue object, the replay core generates a "dummy" reference queue object and associates that dummy reference queue object with the reference object.

At least two methods of the reference queue object may be invoked in order to retrieve the next reference object in the reference queue. The "poll" method, when invoked, removes the reference object that is at the front of the reference queue and returns that reference object if the reference queue contains a reference object, or returns "NULL" if the reference queue does not contain a reference object. The "remove" method, when invoked, waits until the reference queue contains a reference object if the reference queue does not already contain a reference object, and then removes the reference object that is at the front of the reference queue and returns that reference object. These methods are inherently non-deterministic, largely because the garbage collector may garbage-collect an object at an unpredictable time during the execution of application program 102, thereby influencing the outcome of these methods.

As is discussed above, each reference object has a "get" method which returns a strong reference to the referent to which the reference object refers. Additionally, each reference object has an "isEnqueued" method which, when invoked, returns "TRUE" if the reference object is currently within a reference queue, or "FALSE" otherwise. These methods are also inherently non-deterministic.

In order to handle these situations, multiple operations may be performed. In one embodiment of the invention, whenever a non-strong (i.e., weak, soft, or phantom) reference is created, the replay core additionally generates a proxy reference object that imitates the actual reference object. The proxy reference object has the same interface and provides the same "get" and "isEnqueued" methods that the actual reference object has and provides. Indeed, in one embodiment of the invention, the proxy reference object extends and inherits from the actual reference object. In one embodiment of the invention, to accomplish the generation of the proxy reference object, at class loading time, the replay core injects code into the "new" method, which is called in order to create a new object. The injected code, when executed, determines whether the object being created is a reference object, and, if so, generates and returns the proxy reference object in place of the reference object that otherwise would be returned. The proxy reference object refers to the same referent and reference queue to which the non-proxy reference object would have referred.

Once a reference object's "get" method returns "NULL" the first time, that reference object's "get" method is certain to return "NULL" every time thereafter, because the referent has been garbage-collected by that time. Therefore, in one embodiment of the invention, the proxy reference object includes both (a) an access counter and (b) a "first null access" indicator, the values of both of which are initially set to zero. Whenever the "get" method of the proxy reference object is invoked, code within the "get" method determines whether the method is being invoked during record time or during replay time. During record time, every time that the "get" method of the proxy reference object is invoked, code within the "get" method determines whether the first null access indicator's value is zero, and, if so, increments the access counter by one. The code may then invoke the "get" method of the corresponding actual reference object and inspect the result returned by that method. The first time that the "get" method returns "NULL," the code sets the first null access indicator's value equal to the current value of the access counter. The replay core emits, into the replay stream, the value of the proxy reference object's first null access indicator. As a result, during replay time, the replay core has access to information that indicates the number of times that the reference object's "get" method should return a reference to the referent before returning "NULL" thereafter. The replay core can use this information during replay time to ensure that the results produced by each invocation of the reference object's "get" method are consistent with the results that were produced by invocations of the reference object's "get" method during record time.

During replay time, the replay core reads the first null access indicator value that was previously emitted into the replay stream during record time. Whenever the proxy reference object's "get" method is invoked during replay time, code within the "get" method again increments the access counter (which, again, is initialized with a value of zero). Code within the "get" method further determines whether the current value of the access counter is greater than or equal to the first null access indicator value read from the replay stream. If the current value of the access counter is greater or equal to the first null access indicator value, then the proxy reference object's "get" method returns "NULL" rather than the value produced by the actual reference object's "get" method, even if the value produced by the actual reference object's "get" method is not "NULL." This ensures that the referent will not appear to have been garbage-collected later in programmatic execution during replay time than the referent was garbage-collected during record time.

Furthermore, in one embodiment of the invention, in order to ensure that the referent will not be garbage-collected earlier in programmatic execution during replay time than the reference was garbage-collected during record time, an object member of the proxy reference object called "MStrong" is created when the proxy reference object is constructed during replay time. The referent itself is assigned to the "MStrong" object. This causes a strong reference to the referent to be created. As long as the strong reference exists, the strong reference prevents the referent from being garbage-collected. As is discussed above, during replay time, the proxy reference object's "get" method increments the access counter each time that the method is invoked. During replay time, as soon as the access counter's value is greater than or equal to the first null access indicator value read from the replay stream, the "get" method sets "MStrong" to "NULL," thereby removing the strong reference to the referent and allowing the referent to be garbage-collected.

An embodiment of the invention also ensures that the actual reference object itself is not garbage-collected earlier in programmatic execution during replay time than the actual reference object was garbage-collected during record time. In such an embodiment of the invention, during record time, the replay core assigns a unique identifier to the actual reference object when the actual reference object is created. As reference objects are created during programmatic execution, the replay core assigns monotonically increasing identifiers to those reference objects. As a result, during replay time, a given reference object will be assigned the same unique identifier to which that reference object was assigned during record time. During record time, a separate association between each reference object and that reference object's unique identifier is entered into a "weak map." For each such reference object, a separate weak reference to that reference object is created and associated with that reference object's unique identifier. As was mentioned earlier, weak references will not prevent objects from being garbage-collected, so the creation of the weak references to the reference objects will not interfere with the execution of application program 102 (e.g., by causing application program 102 to run out of available memory).

As is mentioned above, when the garbage collector garbage-collects a referent, the garbage collector normally places the reference object that refers to the referent on the reference queue to which the reference object refers. In one embodiment of the invention, during class loading time, the replay core injects, into one or more classes, code which, when executed, prevents a reference object from being placed on a reference queue. The injected code causes that reference object to be placed on a separate temporary reference queue instead whenever the reference object otherwise would have been placed on the actual reference queue (e.g., by the garbage collector). Enqueue events are "flushed" at deterministic points in the execution of application program 102 (e.g., whenever a native proxy function is called, and/or whenever an object's constructor method is called). When this "flushing" process occurs, the replay core places the reference objects in the temporary reference queue into the corresponding actual reference queue. Additionally, the replay core emits, into the replay stream, all of the identifiers of the reference objects in the weak map, and removes those identifiers from the weak map so that those identifiers will not be emitted into the replay stream again if the flushing process occurs again at a later deterministic point during execution.

In one embodiment of the invention, during replay time, a separate association between each reference object and that reference object's unique identifier is entered into a "strong map." For each such reference object, a separate strong reference to that reference object is created and associated with that reference object's unique identifier. As was mentioned earlier, strong references will prevent objects from being garbage-collected. The existence of the strong references to the reference objects prevents the reference objects from being garbage-collected too early during replay time.

During replay time, the flushing process will occur at the same deterministic points of the execution of application program 102 at which the flushing process occurred during record time. During replay time, the unique identifiers previously emitted into the replay stream are read from the replay stream and placed into the actual reference queue of the corresponding reference object. Additionally, during the flushing process at replay time, the references to the reference objects are removed from the strong map, and the "MStrong" members of those reference objects are set to "NULL," thus allowing those reference objects to be garbage-collected.

Because reference objects are added to and removed from reference queues at deterministic points in program execution as a result of the techniques described above, the results of the invocations of poll and remove methods of reference queue objects will be consistent between record time and replay time.

Hardware Overview

Figure 8:
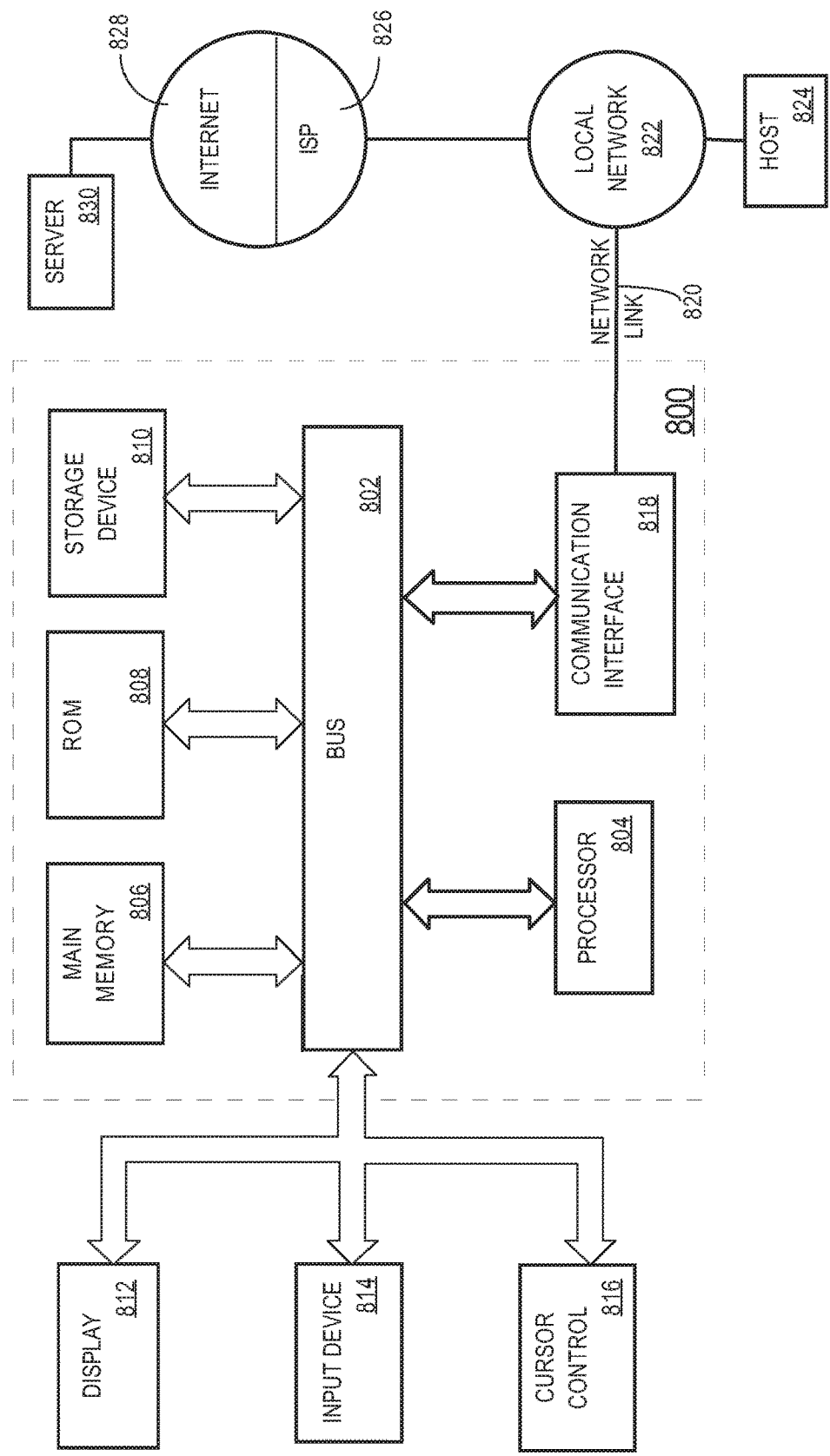
FIG. 8 is a block diagram of a computer system on which embodiments of the present invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one implementation of the invention, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative implementations, hard-wired circuitry may be used in place of or in combination with software instructions to implement the invention. Thus, implementations of the invention are not limited to any specific combination of hardware circuitry and software.

The term "computer-readable medium" as used herein refers to any medium that participates in providing data that causes a machine to operation in a specific fashion. In an implementation implemented using computer system 800, various computer-readable media are involved, for example, in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of computer-readable media include, for example, a floppy disk, a flexible disk, hard disk, magnetic tape, or any other magnetic medium, a CD-ROM, any other optical medium, any other physical medium with patterns, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, implementations of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The entire contents of the following U.S. patent applications are incorporated by reference herein for all purposes: Ser. No. 11/169,522; Ser. No. 11/449,156; Ser. No. 11/449,157; Ser. No. 11/449,158; and Ser. No. 11/943,889.

What is claimed is:

1. A method implemented with a processor equipped with memory-stored instructions for carrying out process of statically initializing classes supportive of a replay core context, where the instructions upon being executed by the processor, perform the initialization process comprising steps of:

prior to initialization of a class associated with application code, determining that the class contains a static initialization method, wherein the static initialization method has a first name and contains a blocking call;

in response to determining that the class contains a static initialization method, renaming the static initialization method to have a second name instead of the first name, wherein a thread that executes the static initialization method having the second name releases a global application lock before making the blocking call;

injecting, into the class, an empty method that has the first name and causes a virtual machine to obtain a class lock on the class upon invocation of the empty method;

injecting, into the class, a checking method which, when executed, determines whether the method having the second name has already been executed, and executes the method having the second name only if the method having the second name has not yet been executed; and injecting, into the application code, at points of execution at which an invocation of the method having the first name could be triggered by the virtual machine, an invocation of the checking method;

wherein in response to the virtual machine invoking the static initialization method that has the first name, the empty method returns without performing the blocking call;

wherein said steps are performed by a replay core that executes in a computing system.

2. The method of claim 1, wherein the injecting, into application code, at points of execution at which an invocation of the method having the first name could be triggered by the virtual machine, an invocation of the checking method comprises:
injecting, at a beginning of each static code block of the class, an invocation of the checking method.

3. The method of claim 1, wherein the injecting, into application code, at points of execution at which an invocation of the method having the first name could be triggered by the virtual machine, an invocation of the checking method comprises:
injecting, at a beginning of each constructor method of the class, an invocation of the checking method.

4. The method of claim 1, wherein the injecting, into application code, at points of execution at which an invocation of the method having the first name could be triggered by the virtual machine, an invocation of the checking method comprises:
into each class that contains a static field access of a static field of an accessed class, injecting, into said class, prior to said static field access, an invocation of the checking method into which a name of the accessed class is passed as input.

5. The method of claim 1, wherein the injecting, into application code, at each point of execution at which an invocation of the method having the first name could be triggered by the virtual machine, an invocation of the checking method comprises:
injecting an invocation of the checking method into code of a function that is used to perform reflection relative to the class.

6. The method of claim 1, wherein invocation, by the checking method, of the static initialization method having the second name initializes the class without the virtual machine obtaining the class lock on the class.

7. The method of claim 1, wherein the empty method returning causes the virtual machine to assume that the class has been initialized and to release the class lock on the class.

8. A system comprising:
a processor configured to:
determine that a class associated with application code contains a static initialization method, wherein the static initialization method has a first name and contains a blocking call;
rename the static initialization method to have a second name instead of the first name in response to determining that the class contains a static initialization method, wherein a thread that executes the static initialization method having the second name releases a global application lock before making the blocking call;
inject, into the class, an empty method that has the first name and causes a virtual machine to obtain a class lock on the class upon invocation of the empty method;
inject, into the class, a checking method which, when invoked, determines whether the method having the second name has already been invoked, and invokes the method having the second name only if the method having the second name has not yet been invoked; and
inject, into the application code, at points of execution at which an invocation of the static initialization method by a virtual machine could be triggered by a virtual machine, an invocation of the checking method;
wherein, in response to the virtual machine invoking the static initialization method that has the first name, the empty method returns without performing the blocking call.

9. The system of claim 8, wherein to inject the checking method into the class the processor is configured to:
inject, at a beginning of each static code block of the class, an invocation of the checking method.

10. The system of claim 8, wherein to inject the checking method into the class the processor is configured to:
inject, at a beginning of each constructor method of the class, an invocation of the checking method.

11. The system of claim 8, wherein to inject the checking method into the class the processor is configured to:
into each class that contains a static field access of a static field of an accessed class, inject, into said class, prior to said static field access, an invocation of the checking method into which a name of the accessed class is passed as input.

12. The system of claim 8, wherein to inject the checking method into the class the processor is configured to:
inject an invocation of the checking method into code of a function that is used to perform reflection relative to the class.

13. The system of claim 8, wherein the processor is configured to:
maintain a set of classes that have had a checking method injected that determines whether a method having an alternative name to a static initialization method of that class has already been executed.

14. The system of claim 13, wherein the processor is configured to:
determine that a class that is not in the set of classes contains a static field access of a field of a class in the set of classes; and
inject, prior to any static field access contained in a body of the class that is not in the set of classes, an invocation of a checking method into which an identity of the class associated with the static field access is passed as input.

15. The system of claim 8, wherein invocation, by the checking method, of the static initialization method having the second name initializes the class without the virtual machine obtaining the class lock on the class.

16. A non-transitory computer-readable storage medium storing instructions which, when executed by a processor, cause the processor to:
prior to initialization of a class associated with application code, determine that the class contains a static initialization method, wherein the static initialization method has a first name and contains a blocking call that requires release of a global application lock;
rename the static initialization method to have a second name instead of the first name in response to determining that the class contains a static initialization method;
inject, into the class, an empty method that has the first name and causes a virtual machine to obtain a class lock on the class upon invocation of the empty method;
inject, into the class, a checking method which, when invoked, determines whether the method having the second name has already been executed relative to the class, and executes the method having the second name relative to the class only if the method having the second name has not yet been executed relative to the class; and
inject, into the application code, at all points of execution at which an invocation of the method having the first name by a virtual machine could possibly be triggered, an invocation of the checking method;

wherein in response to the virtual machine invoking the static initialization method that has the first name, the empty method returns without performing the blocking call.

17. The non-transitory computer-readable storage medium of claim 16, wherein the instructions that inject the checking method into the class cause the processor to:

inject, at a beginning of each static code block of the class, an invocation of the checking method; and inject, at a beginning of each constructor method of the class, an invocation of the checking method.

18. The non-transitory computer-readable storage medium of claim 17, wherein the instructions that inject the checking method into the class cause the processor to:

into each particular class that contains a static field access of a static field of an accessed class, inject, into said particular class, prior to said static field access, an invocation of the checking method into which a name of the accessed class is passed as input; and inject an invocation of the checking method into code of a function that is used to perform reflection relative to the class.

19. The non-transitory computer-readable storage medium of claim 16, wherein invocation, by the checking method, of the static initialization method having the second name initializes the class without the virtual machine obtaining the class lock on the class.

20. The non-transitory computer-readable storage medium of claim 16, wherein the empty method returning causes the virtual machine to release the class lock on the class.

* * * * *